United States Patent
Kondo

(10) Patent No.: US 11,831,626 B2
(45) Date of Patent: Nov. 28, 2023

(54) INFORMATION PROCESSING SYSTEM EXECUTING ENCRYPTION PROCESSING AND DECRYPTION PROCESSING AND STORAGE MEDIUM

(71) Applicant: L&I Inc., Tokyo (JP)

(72) Inventor: Shinichi Kondo, Tokyo (JP)

(73) Assignee: L&I Inc., Tokyo (JP)

( * ) Notice: Subject to any disclaimer, the term of this patent is extended or adjusted under 35 U.S.C. 154(b) by 0 days.

(21) Appl. No.: 17/971,218

(22) Filed: Oct. 21, 2022

(65) Prior Publication Data
US 2023/0088589 A1   Mar. 23, 2023

Related U.S. Application Data

(63) Continuation of application No. PCT/JP2020/040519, filed on Oct. 28, 2020.

(30) Foreign Application Priority Data

Apr. 24, 2020  (JP) .................. 2020-077278

(51) Int. Cl.
  *H04L 9/40* (2022.01)
  *H04L 9/16* (2006.01)
(52) U.S. Cl.
  CPC ............ *H04L 63/0485* (2013.01); *H04L 9/16* (2013.01)
(58) Field of Classification Search
  CPC .............................. H04L 63/0485; H04L 9/16
  USPC ........................................................ 713/150
  See application file for complete search history.

(56) References Cited

U.S. PATENT DOCUMENTS

| 6,085,323 | A | 7/2000 | Shimizu et al. |
| 2019/0340251 | A1* | 11/2019 | Peddada ............... H04L 9/16 |
| 2021/0255906 | A1 | 8/2021 | Nasu |

FOREIGN PATENT DOCUMENTS

| JP | H09179768 | 7/1997 |
| JP | H10214233 | 8/1998 |
| JP | 2001236259 | 8/2001 |
| JP | 2014533445 | 12/2014 |
| JP | 2015148933 | 8/2015 |
| JP | 2016076797 | 5/2016 |
| JP | 2017078880 | 4/2017 |

(Continued)

OTHER PUBLICATIONS

Office Action issued in corresponding Japanese Patent Application No. 2020-564008, dated Jan. 6, 2021, English Translation, 6 pages.

(Continued)

*Primary Examiner* — Michael S McNally
(74) *Attorney, Agent, or Firm* — Burris Law, PLLC

(57) ABSTRACT

An information processing system includes a first device and a second device. The first device generates first encrypted data by applying a first encryption with respect to the original data stored in a shared storage area, and causing the first encrypted data to be stored in the shared storage area. The second device generates second encrypted data by applying a second encryption with respect to the first encrypted data stored in the shared storage area, and causes the second encrypted data to be stored in the shared storage area. The first device deletes the original data and the first encrypted data from the shared storage area.

13 Claims, 16 Drawing Sheets

(56) References Cited

FOREIGN PATENT DOCUMENTS

| | | |
|---|---|---|
| JP | 6644202 | 2/2020 |
| WO | 2013057757 | 4/2013 |

OTHER PUBLICATIONS

Tanaka, Toshiaki et al., Mutual Digital Signature Scheme on On-Line Electronic Contract System, IEICE Technical Report, Jan. 20, 1992, pp. 19-25, vol. 91, No. 420, The Institute of Electronics, Information and Communication Engineers, Japan.

International Search Report for International Application PCT/JP2020/040519; dated Jan. 19, 2021.

* cited by examiner

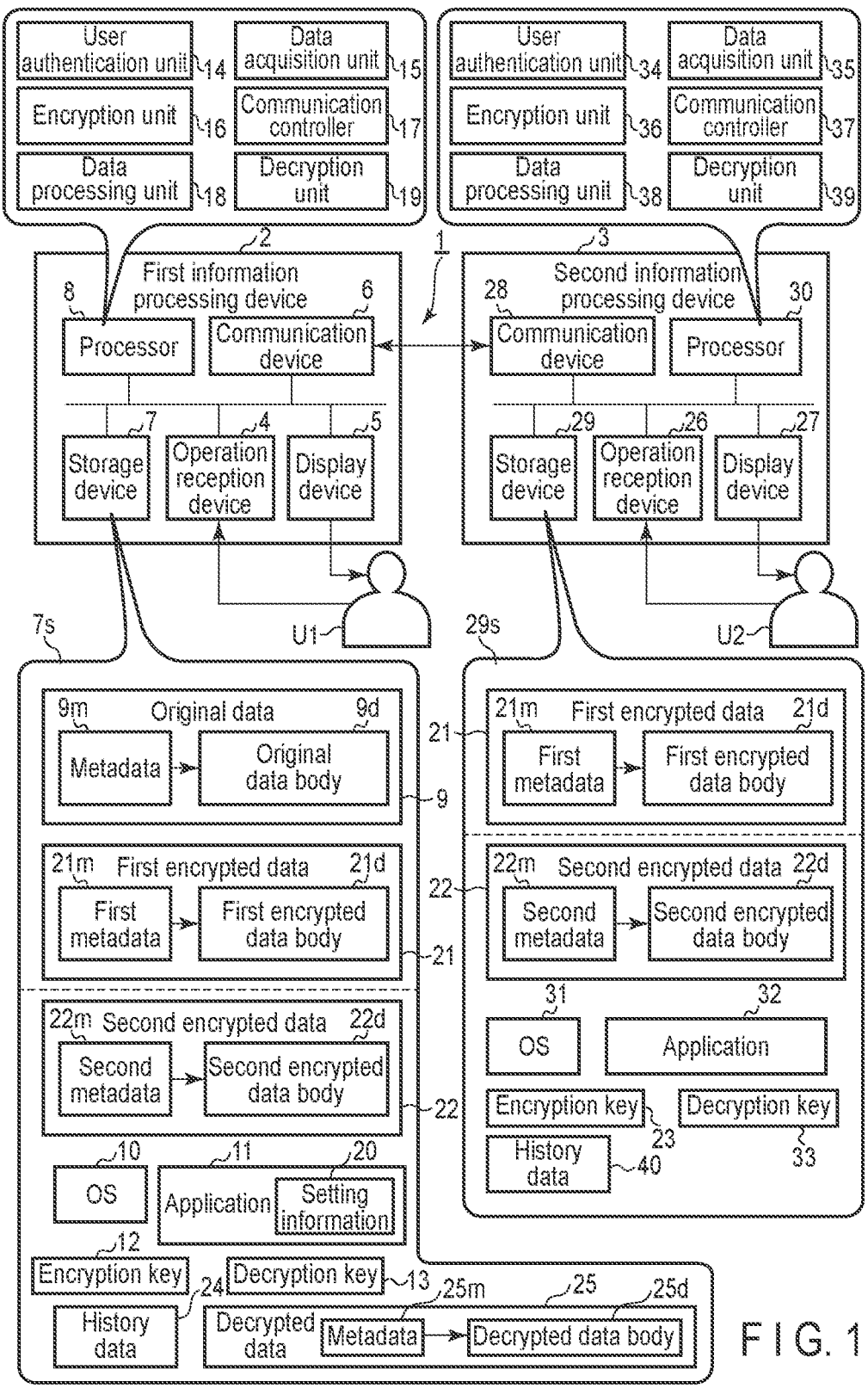
F I G. 1

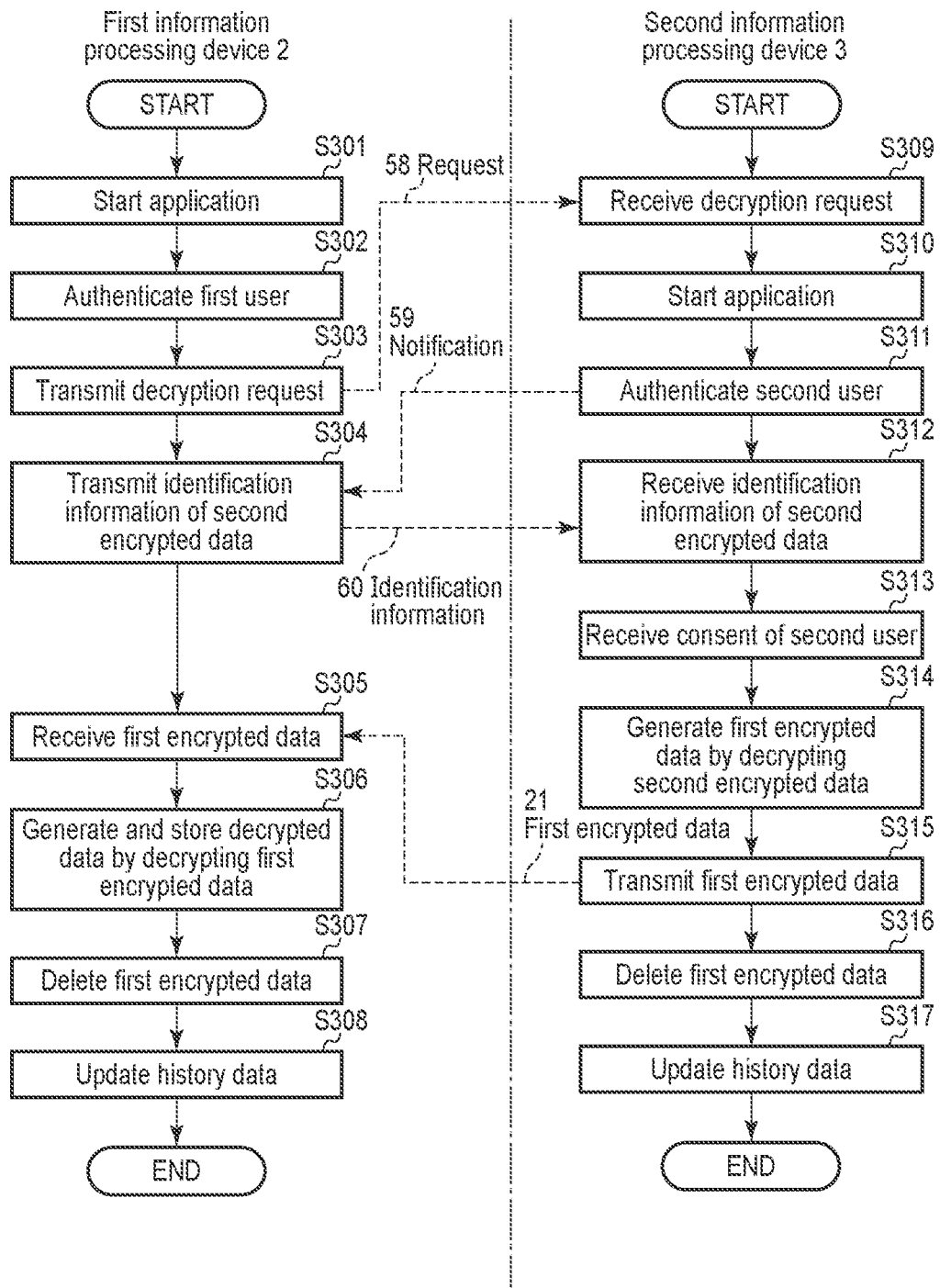
F I G. 3

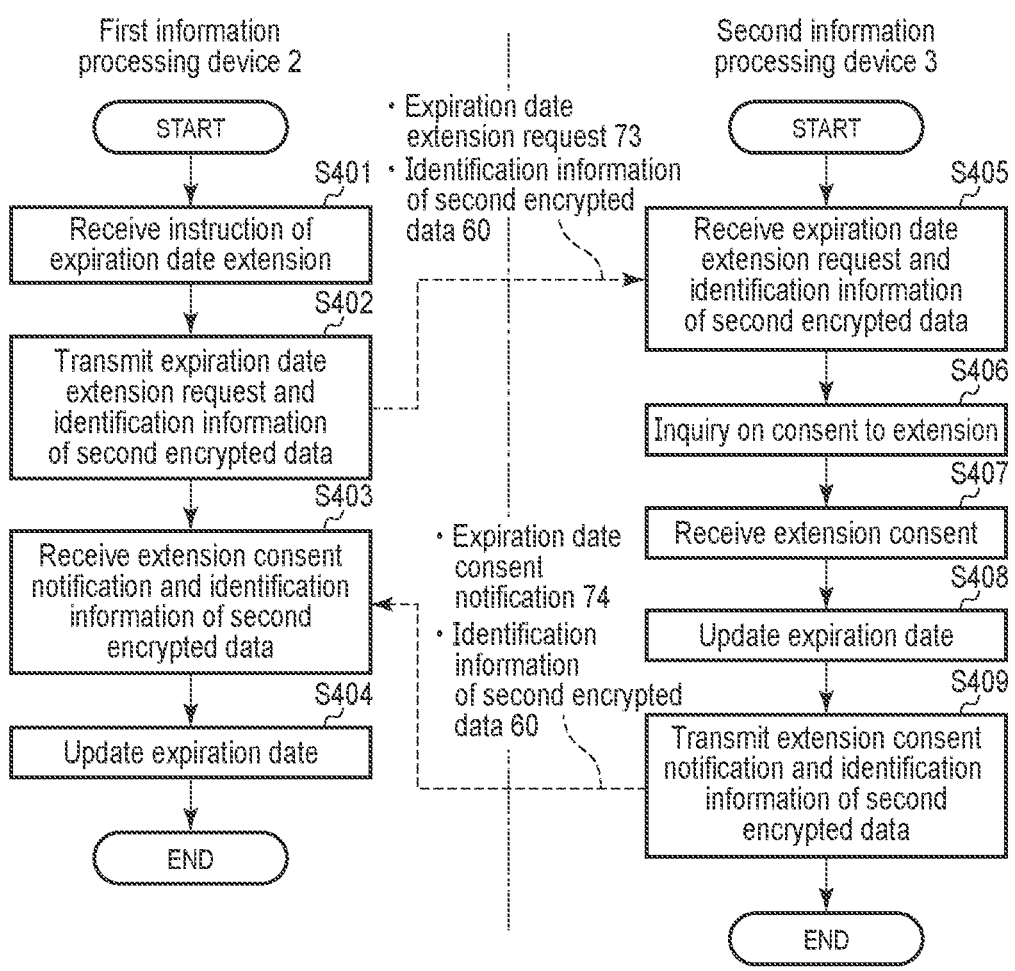
F I G. 4

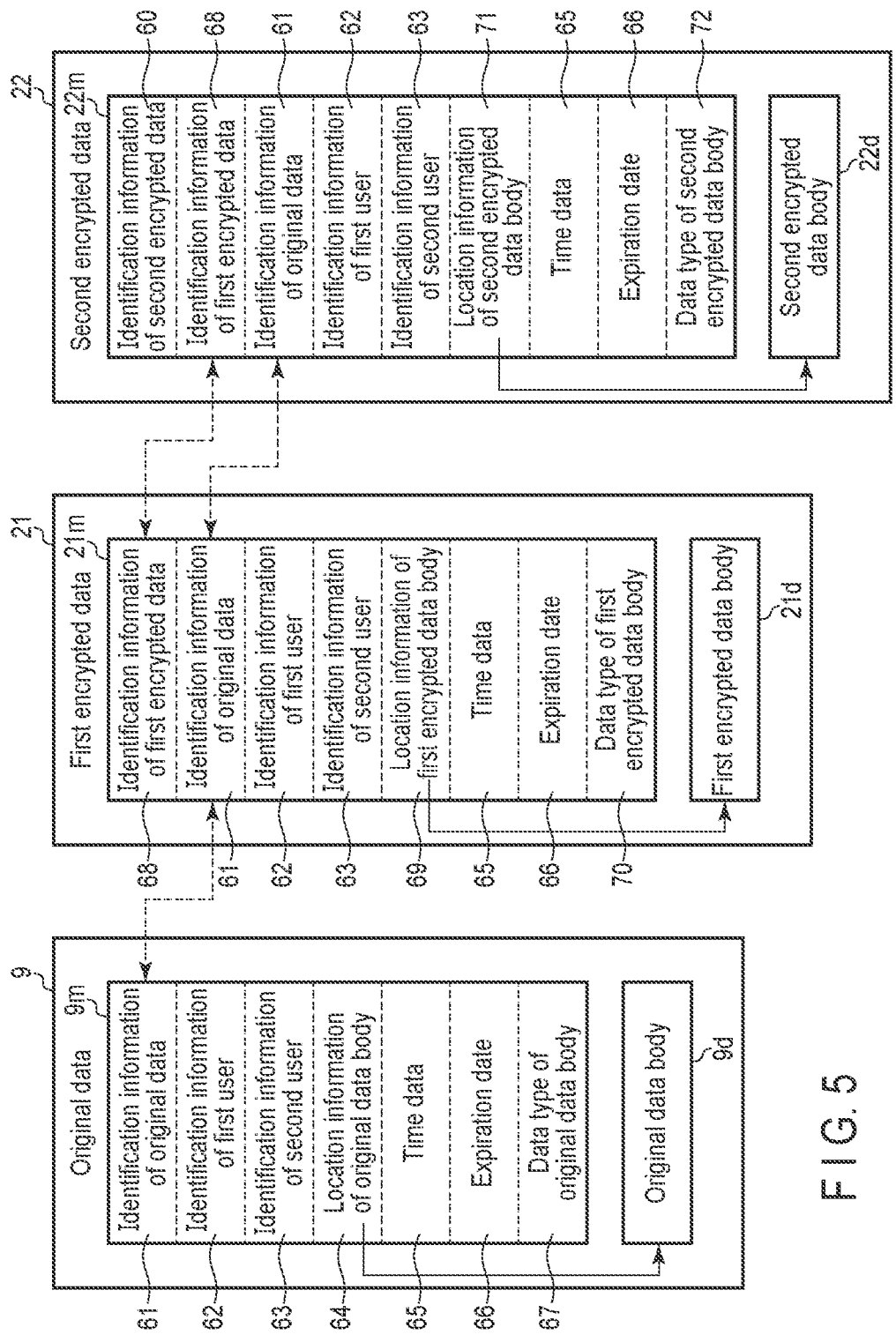
F I G. 5

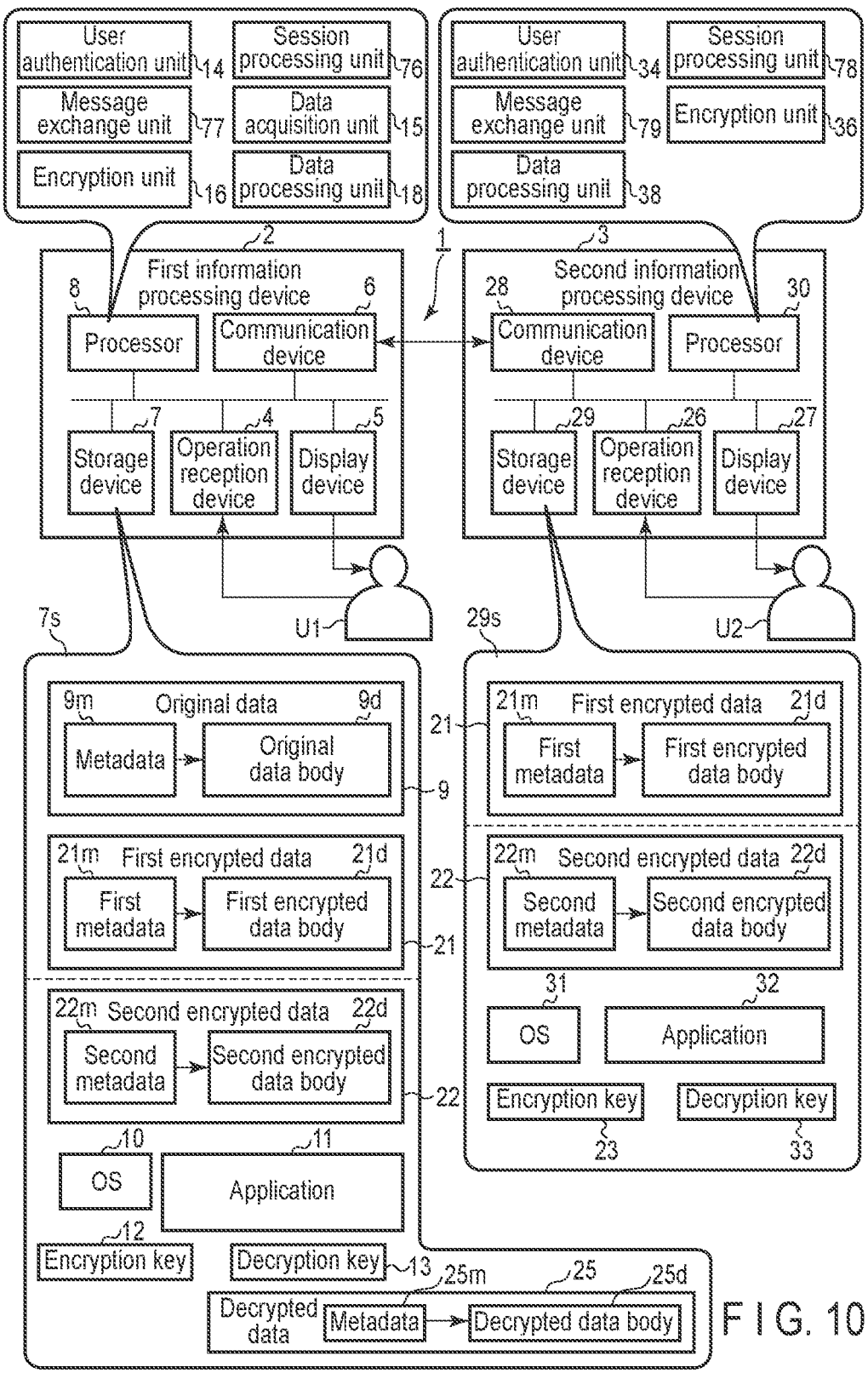
F I G. 10

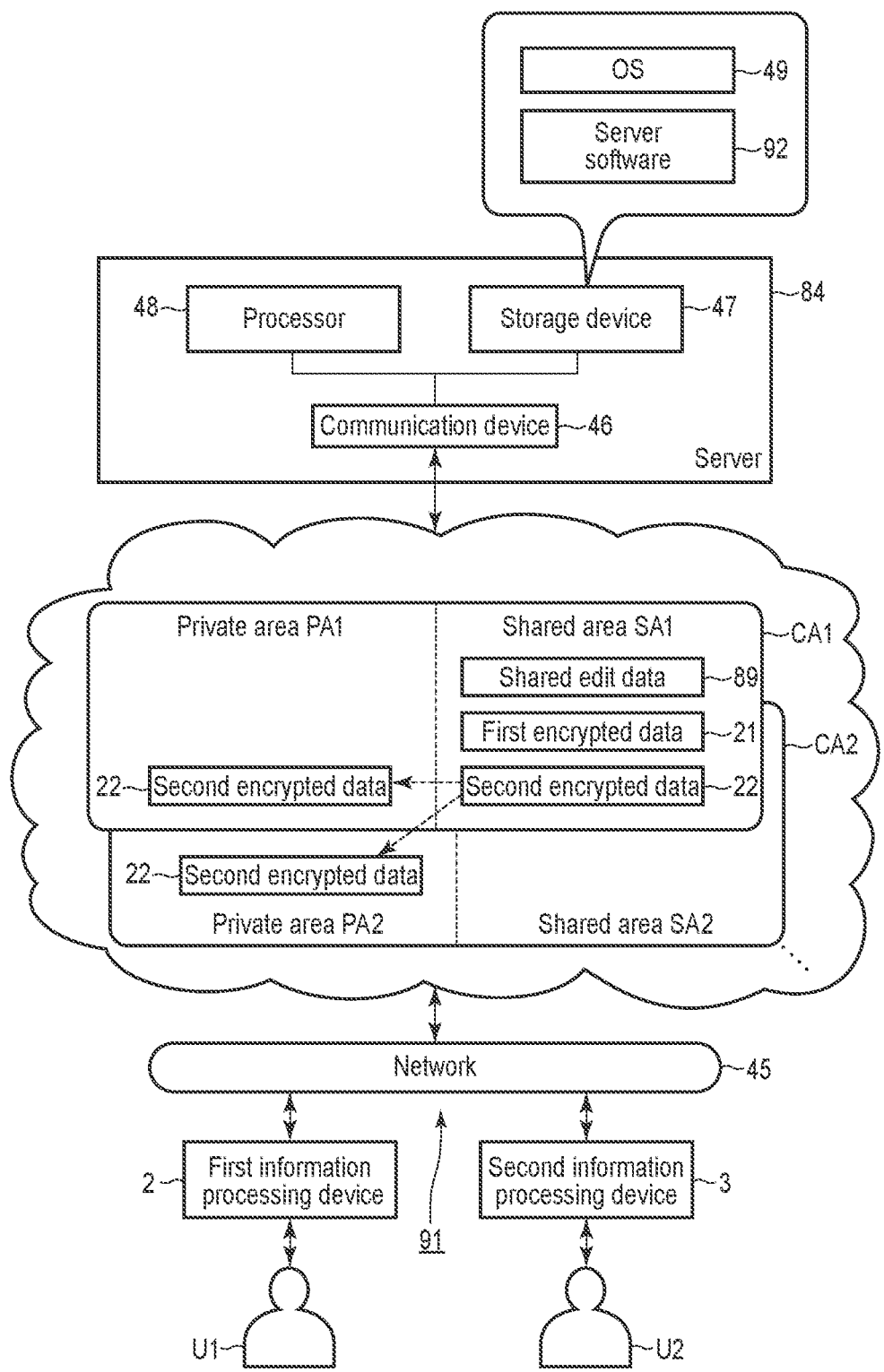
F I G. 15

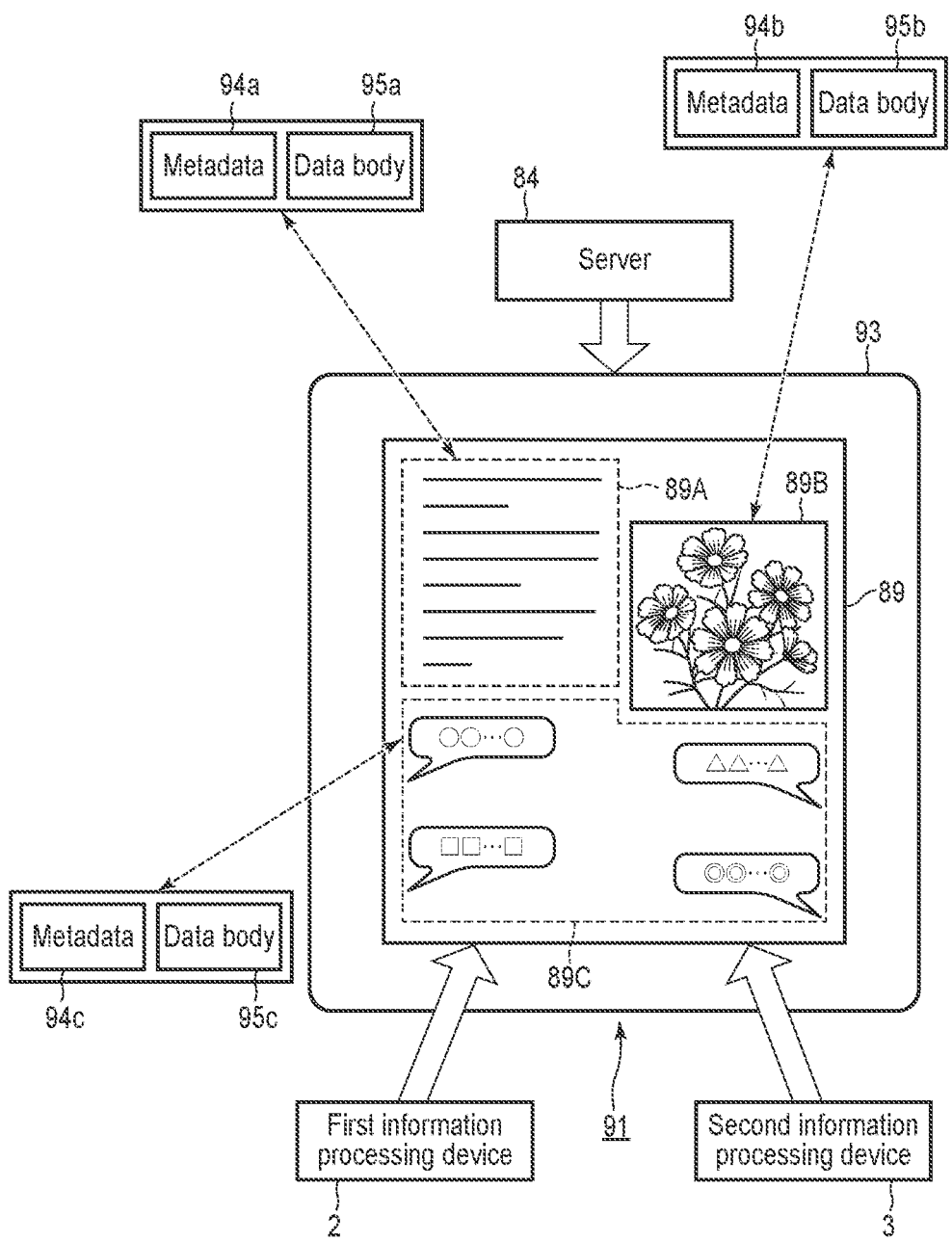
F I G. 16

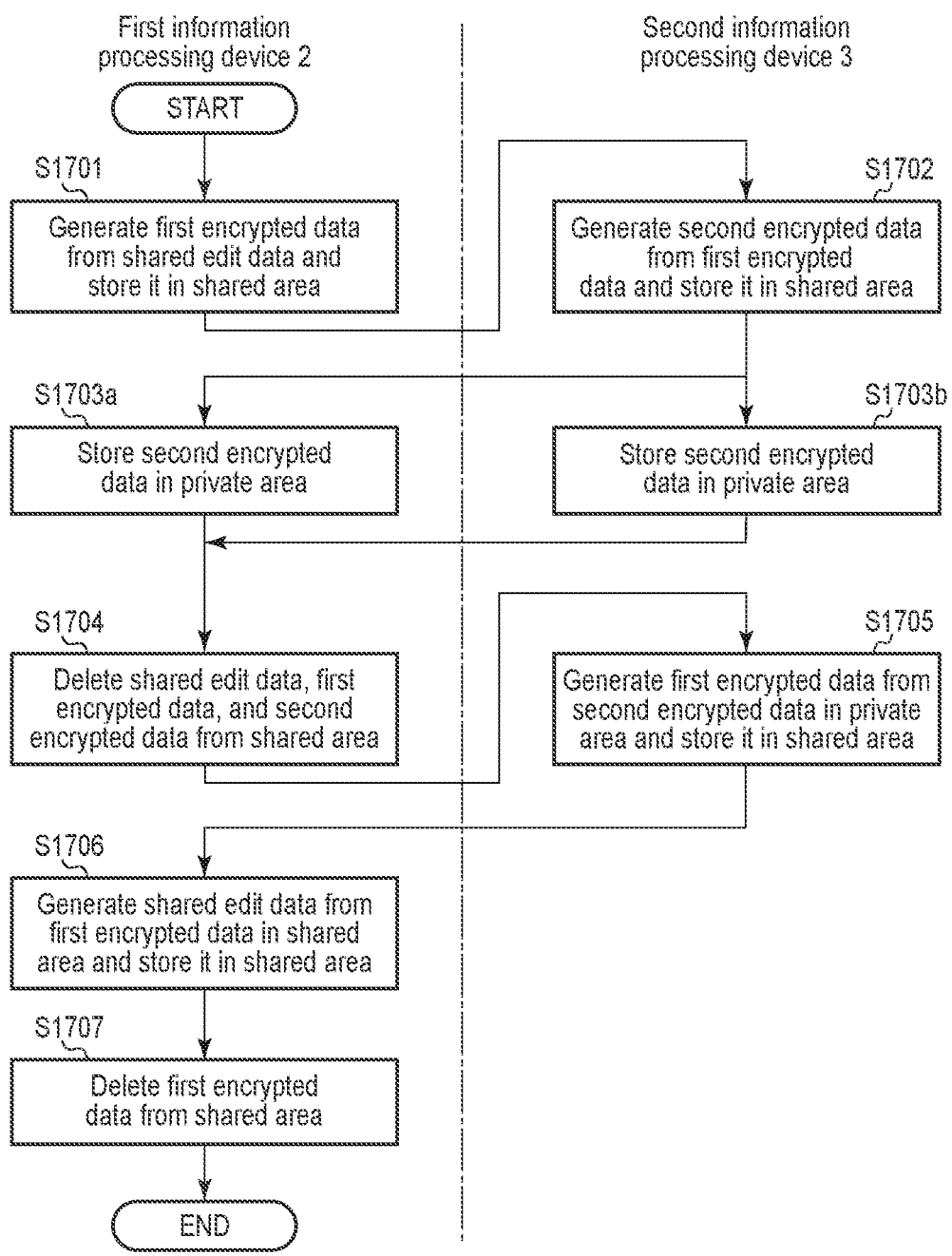
F I G. 17

INFORMATION PROCESSING SYSTEM EXECUTING ENCRYPTION PROCESSING AND DECRYPTION PROCESSING AND STORAGE MEDIUM

CROSS-REFERENCE TO RELATED APPLICATIONS

This application is a continuation of International Application No. PCT/JP2020/040519, filed on Oct. 28, 2020, which claims priority to and the benefit of Japanese Patent Application No. 2020-077278, filed on Apr. 24, 2020. The disclosures of the above applications are incorporated herein by reference.

FIELD

The present disclosure relates generally to an information processing system and a storage medium that ensure data security.

BACKGROUND

In order to ensure data security, use restriction of data or generation of backup data is widely used.

For example, data encryption, password authentication, biometric authentication, and two-factor authentication can be used to restrict the use of data by unauthorized users.

Backup data generation can be used to prevent data loss or to recover destroyed data.

As a patent literature preceding the present application, JP 6644202 B is cited.

SUMMARY

Due to the improvement of the processing capacity of information processing devices, the use of low-level use restrictions may cause an unauthorized user to release the use restriction of data and misuse the data.

Generating backup data reduces the risk of data loss. However, generating backup data increases the number of data and the possibility of data leakage.

The present disclosure has been made in view of the above circumstances, and relates to an information processing system and a storage medium for ensuring the safety of data.

An information processing system according to a first aspect of the present disclosure includes a first device operated by a first user who designates data to be an encryption target and, subsequently, designates data to be a decryption target; a second device operated by a second user selected by the first user; and a server capable of communicating with the first device and the second device and including a storage area. The first device and the second device are provided with: a function of forming a session between the first device and the second device; and a function of causing an original data body to be stored in the storage area, the original data body being communication data shared by the first user and the second user through communication between the first device and the second device using the session. The first device is provided with: in encryption processing, a function of causing original data including the original data body designated by the first user as the encryption target and original metadata corresponding to the original data body to be stored in the storage area; in the encryption processing, a function of generating a first encrypted data body obtained by applying a first encryption with respect to the original data body using a first encryption key, generating first encrypted data including the first encrypted data body and first metadata corresponding to the first encrypted data body and associated with the original metadata, and causing the first encrypted data to be stored in a shared storage area of the storage area; in the encryption processing, a function of causing second encrypted data that includes a second encrypted data body and second metadata to be stored in a first storage area corresponding to the first device of the storage area, the second encrypted data body generated by the second device applying a second encryption with respect to the first encrypted data body included in the first encrypted data using a second encryption key, the second metadata corresponding to the second encrypted data body and associated with the first metadata; in the encryption processing, a function of recognizing, based on the second metadata included in the second encrypted data, the original data including the original metadata associated with the second metadata and the first encrypted data including the first metadata associated with the second metadata, deleting the original data from the storage area, and deleting the first encrypted data and the second encrypted data from the shared storage area; in decryption processing, a function of transmitting identification information of the second encrypted data designated by the first user as the decryption target to the second device; in the decryption processing, a function of generating the original data that includes the original data body and the original metadata, and causing the original data to be stored in the storage area, the original data body obtained by the second device applying release of the first encryption with respect to the first encrypted data body included in the first encrypted data stored in the shared storage area using a first decryption key, the original metadata corresponding to the original data body and associated with the first metadata; and in the decryption processing, a function of deleting from the shared storage area the first encrypted data including the first metadata associated with the original metadata included in the original data. The second device is provided with: in the encryption processing, a function of generating the second encrypted data body by applying the second encryption with respect to the first encrypted data body included in the first encrypted data stored in the shared storage area using the second encryption key, generating the second encrypted data including the second encrypted data body and the second metadata corresponding to the second encrypted data body and associated with the first metadata, and causing the second encrypted data to be stored in the shared storage area; in the encryption processing, a function of causing the second encrypted data stored in the shared storage area to be stored in a second storage area corresponding to the second device of the storage area; and in the decryption processing, a function of receiving the identification information from the first device, generating the first encrypted data body by applying release of the second encryption using a second decryption key with respect to the second encrypted data body included in the second encrypted data stored in the second storage area and corresponding to the identification information, generating the first encrypted data including the first encrypted data body and the first metadata corresponding to the first encrypted data body and associated with the second metadata, and causing the first encrypted data to be stored in the shared storage area. Each of the original metadata, the first metadata, and the second metadata includes original data identification information, first user identification information indicating the first user, second user identification information indicating the second user, an expiration date, and a data type of the original data body. The first device, in a case where the expiration date of the second metadata included in the second encrypted data stored in the first storage area has elapsed, is further provided with a function of deleting the second encrypted data stored in the first storage area. The second device, in a case where the expiration date of the second metadata included in the second encrypted data stored in the second storage area has elapsed, is further provided with a function of deleting the second encrypted data stored in the second storage area.

An information processing system according to a second aspect of the present disclosure includes a first device operated by a first user who designates data to be an encryption target and, subsequently, designates data to be a decryption target, the first device including a first storage device; and a second device operated by a second user selected by the first user, the second device including a second storage device and capable of communicating with the first device. The first device and the second device are provided with: a function of forming a session between the first device and the second device; and a function of causing an original data body to be stored in the first storage device, the original data body being communication data shared by the first user and the second user through communication between the first device and the second device using the session. The first device is provided with: in encryption processing, a function of causing original data including the original data body designated by the first user as the encryption target and original metadata corresponding to the original data body to be stored in the first storage device; in the encryption processing, a function of generating a first encrypted data body obtained by applying a first encryption with respect to the original data body using a first encryption key, generating first encrypted data including the first encrypted data body and first metadata corresponding to the first encrypted data body and associated with the original metadata, and causing the first encrypted data to be stored in the first storage device; in the encryption processing, a function of transmitting the first encrypted data to the second device; in the encryption processing, a function of receiving from the second device second encrypted data including a second encrypted data body and second metadata corresponding to the second encrypted data body and associated with the first metadata, and causing the second encrypted data to be stored in the first storage device, the second encrypted data body generated by applying a second encryption with respect to the first encrypted data body using a second encryption key; in the encryption processing, a function of recognizing, based on the second metadata included in the second encrypted data, the original data including the original metadata associated with the second metadata and the first encrypted data including the first metadata associated with the second metadata, and deleting the original data and the first encrypted data from the first storage device; in decryption processing, a function of transmitting identification information of the second encrypted data designated by the first user as the decryption target to the second device; in the decryption processing, a function of receiving from the second device the first encrypted data including the first encrypted data body and the first metadata corresponding to the first encrypted data body and associated with the second metadata, and causing the first encrypted data to be stored in the first storage device, the first encrypted data body obtained by applying release of the second encryption using a second decryption key with respect to the second encrypted data body included in the second encrypted data stored in the second storage device and corresponding to the identification information; in the decryption processing, a function of generating the original data body by applying release of the first encryption using a first decryption key with respect to the first encrypted data body included in the first encrypted data stored in the first storage device, generating the original data including the original data body and the original metadata corresponding to the original data body and associated with the first metadata, and causing the original data to be stored in the first storage device; and in the decryption processing, a function of deleting from the first storage device the first encrypted data including the first metadata associated with the original metadata included in the original data. The second device is provided with: in the encryption processing, a function of causing the first encrypted data to be stored in the second storage device in a case where the second device receives the first encrypted data from the first device; in the encryption processing, a function of generating the second encrypted data body by applying the second encryption using the second encryption key with respect to the first encrypted data body included in the first encrypted data, generating the second encrypted data including the second encrypted data body and the second metadata corresponding to the second encrypted data body and associated with the first metadata, and causing the second encrypted data to be stored in the second storage device; in the encryption processing, a function of transmitting the second encrypted data to the first device; in the encryption processing, a function of deleting the first encrypted data stored in the second storage device from the second storage device; in the decryption processing, a function of receiving the identification information from the first device, generating the first encrypted data body by applying release of the second encryption using the second decryption key with respect to the second encrypted data body included in the second encrypted data stored in the second storage device and corresponding to the identification information, generating the first encrypted data including the first encrypted data body and the first metadata corresponding to the first encrypted data body and associated with the second metadata, and causing the first encrypted data to be stored in the second storage device; in the decryption processing, a function of transmitting the first encrypted data to the first device; and in the decryption processing, a function of deleting from the second storage device the first encrypted data. Each of the original metadata, the first metadata, and the second metadata includes original data identification information, first user identification information indicating the first user, second user identification information indicating the second user, an expiration date, and a data type of the original data body. The first device, in a case where the expiration date of the second metadata included in the second encrypted data stored in the first storage device has elapsed, is further provided with a function of deleting the second encrypted data stored in the first storage device. The second device, in a case where the expiration date of the second metadata included in the second encrypted data stored in the second storage device has elapsed, is further provided with a function of deleting the second encrypted data stored in the second storage device.

According to the present disclosure, data security can be ensured.

Additional objects and advantages of the disclosure will be set forth in the description which follows, and in part will be obvious from the description, or may be learned by practice of the disclosure. The objects and advantages of the disclosure may be realized and obtained by means of the instrumentalities and combinations particularly pointed out hereinafter.

DRAWINGS

The accompanying drawings, which are incorporated in and constitute a part of the specification, illustrate embodiments of the disclosure, and together with the general description given above and the detailed description of the embodiments given below, serve to explain the principles of the disclosure.

FIG. 1 is a block diagram illustrating an example of a configuration of an information processing device according to a first embodiment.

FIG. 3 is a flowchart illustrating an example of decryption processing executed by the information processing device according to the first embodiment.

FIG. 4 is a flowchart illustrating an example of expiration date extension processing executed by the information processing device according to the first embodiment.

FIG. 5 is a view illustrating an example of the relationship between original data, first encrypted data, and second encrypted data according to the first embodiment.

FIG. 10 is a block diagram showing an example of a configuration of an information processing system according to a fifth embodiment.

FIG. 15 is a block diagram showing an example of a configuration of an information processing system according to a seventh embodiment.

FIG. 16 is a view illustrating an example of a multimedia board realized by the information processing system according to the seventh embodiment.

FIG. 17 is a flowchart illustrating an example of processing executed by the information processing device according to the seventh embodiment.

DETAILED DESCRIPTION

Figure 2:
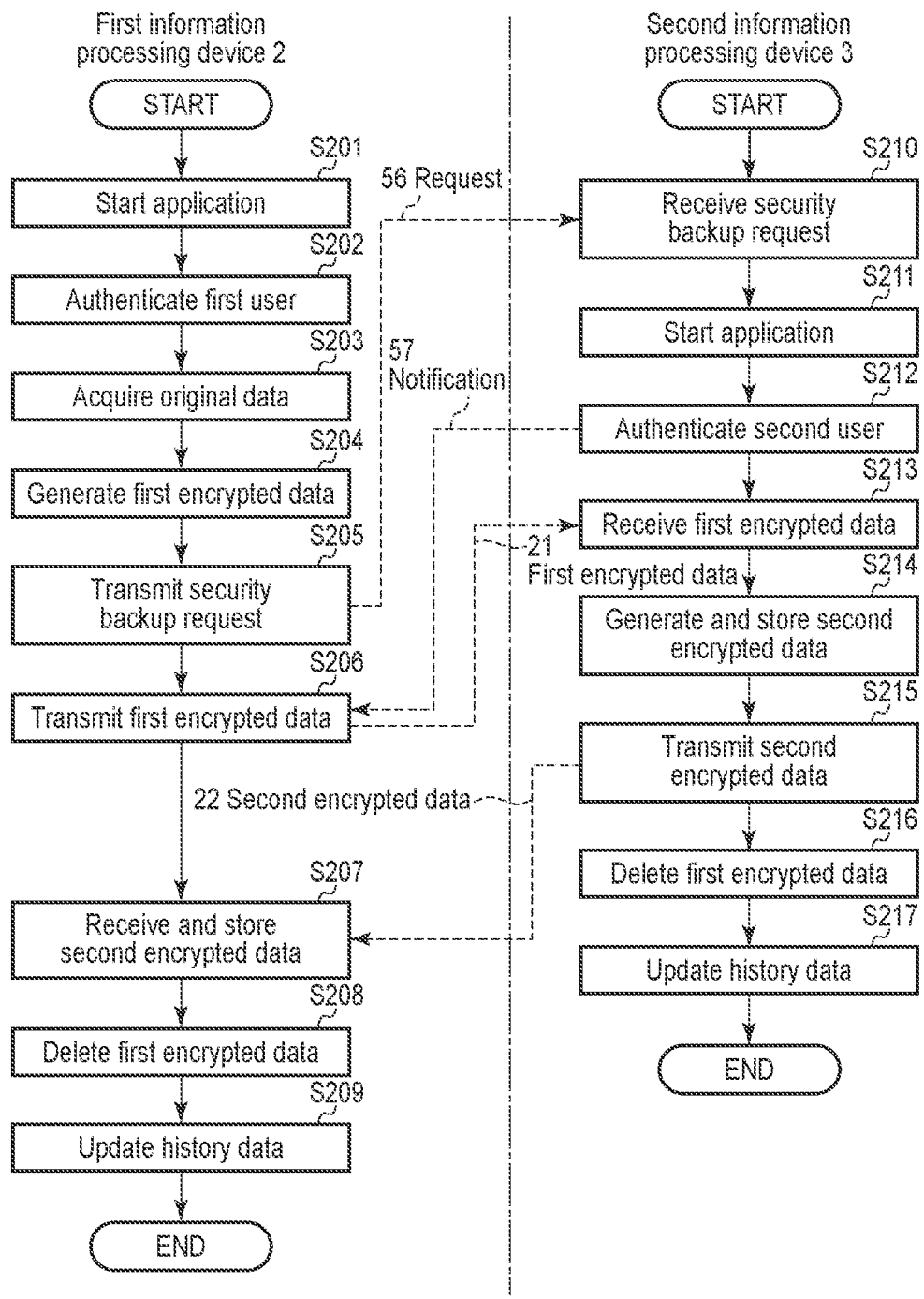
FIG. 2 is a flowchart illustrating an example of encryption processing executed by the information processing device according to the first embodiment.

Embodiments of the present disclosure will be described below with reference to the accompanying drawings. In the drawings, identical functions and components are denoted by similar reference numbers, and explanations thereof are omitted or simplified.

First Embodiment

In a first embodiment, an information processing system that restricts the use of data and generates and stores backup data based on the consent of a plurality of users and permits the use of the data based on the consent of the plurality of users is described.

In the following description, processing for restricting the use of data, software, or device is referred to as use restriction processing. Processing for releasing use restriction of data, software, or device is referred to as restriction release processing.

The use restriction processing includes, for example, an encryption of data, a use restriction by setting a password, a use restriction based on biometric data authentication, a use restriction based on two-factor authentication, and a use restriction based on user authentication information stored in an integrated circuit (e.g., IC chip).

The restriction release processing includes, for example, a decryption of data, releasing the use restriction based on password authentication, releasing the use restriction based on the biometric data authentication, releasing the use restriction based on the two-factor authentication, and releasing the use restriction based on the user authentication information stored in the integrated circuit.

In the first embodiment, a case in which encryption is performed as the use restriction processing with respect to original data and decryption is performed as the restriction release processing with respect to the encrypted data is described as an example. However, other processing may also be used as the use restriction processing and the restriction release processing. Various methods can be used for the method of encryption and the method of decryption.

FIG. 1 is a block diagram showing an example of a configuration of information processing system 1 according to the first embodiment.

The information processing system 1 includes a first information processing device 2 and a second information processing device 3.

The first information processing device 2 and the second information processing device 3 can communicate with each other. The communication performed between the first information processing device 2 and the second information processing device 3 includes, for example, a short-distance wireless communication, a wireless local area network (LAN) communication, or a communication used on the Internet.

The first information processing device 2 is operated by a first user U1. The second information processing device 3 is operated by a second user U2. The first and second information processing devices 2 and 3 are various devices, such as a computer, a cell phone, a portable information terminal, or a smart watch.

The first information processing device 2 is described below.

The first information processing device 2 includes an operation reception device 4, a display device 5, a communication device 6, a storage device 7, and a processor 8.

The operation reception device 4 is, for example, a pointing device such as a mouse, a touch panel, a touch pad, or a keyboard.

The display device 5 is, for example, a display device such as an organic electroluminescence (EL) display or a liquid crystal display. The display device 5, for example, displays various data or information under the control of the processor 8.

The operation reception device 4 and the display device 5 are used as user interface devices for the first information processing device 2.

The communication device 6 is a device that, for example, under the control of the processor 8, performs transmission and reception of data, information, signals, requests, commands, instructions, notifications, calls, or responses wirelessly or in a wired manner to and from, for example, other devices such as the second information processing device 3.

The storage device 7 is one or more memories available to the first information processing device 2. The storage device 7 includes, for example, a nonvolatile memory and a volatile memory. The storage device 7 stores, for example, original data 9, an operating system (hereinafter referred to as "OS") 10, application software 11, and an encryption key 12 and a decryption key 13 corresponding to the first user U1. The storage device 7 includes a confidential area 7s.

The encryption key 12 may be generated by the first user U1, may, for example, be generated by a component of the first information processing device 2 such as the application software 11, or may be issued by a cryptographic key issuer (natural or legal person).

The decryption key 13 may be generated by the first user U1, may, for example, be generated by a component of the first information processing device 2 such as the application software 11, or may be issued by a decryption key issuer (natural or legal person).

The original data 9 is data to be processed in the first embodiment.

The OS 10 is executed by the processor 8 and controls various devices provided in the first information processing device 2.

By executing the application software 11, the processor 8 functions as a user authentication unit 14, a data acquisition unit 15, an encryption unit 16, a communication controller 17, a data processing unit 18, and a decryption unit 19. The processor 8 is, for example, a central processing unit (CPU), a micro processing unit (MPU), or a graphics processing unit (GPU).

First, encryption processing performed by the first information processing device 2 is described.

When the application software 11 is started by the processor 8 under the control of the OS 10, the user authentication unit 14 determines whether or not the first user U1 of the first information processing device 2 is permitted to use the application software 11. The user authentication unit 14 can use various types of use restriction processing described above to authenticate the first user U1. As a more specific example, the user authentication unit 14 uses, for example, password authentication, biometric data authentication, two-factor authentication to determine whether or not the first user U1 is authorized to use the application software 11.

In a case where it is determined that the first user U1 is permitted to use the application software 11, the data acquisition unit 15 acquires the original data 9. For example, the data acquisition unit 15 may receive designation of generated original data 9 made by the first user U1 via the operation reception device 4 and acquire the original data 9 from the storage device 7 or other information processing devices based on the designation. For example, the data acquisition unit 15 may receive an operation performed by the first user U1 via the operation reception device 4 and generate the original data 9 according to the operation by the first user U1.

The data acquisition unit 15 may, for example, receive designation of the second user U2 (designation of a backup storage partner) from the first user U1 via the operation reception device 4, or may select the second user U2 from among multiple candidates.

The data acquisition unit 15 may acquire the original data 9 for each predetermined period of time. For example, time data may be attached to the data, and the data acquisition unit 15 may generate the original data 9 based on the data of which a predetermined time has elapsed from the time indicated by the time data.

The original data 9 includes, for example, metadata 9m and an original data body 9d.

The metadata 9m includes information that indicates attributes or characteristics of the original data body 9d. The metadata 9m is, for example, additional information of the original data body 9d. The metadata 9m includes, for example, identification information of the original data 9 (e.g., name, data ID, or title), identification information of the first user U1 (e.g., name, user ID, or communication address of the first user U1), identification information of the second user U2 (e.g., name, user ID, or communication address of the second user U2), location information of the original data body 9d corresponding to the metadata 9m, time data (including, for example, time stamp or generation time of the original data 9), expiration date, and data type of the original data body 9d. In the first embodiment, identification information of the first information processing device 2 may be used together with the identification information of the first user U1 or instead of the identification information of the first user U1. In the first embodiment, identification information of the second information processing device 3 may be used together with the identification information of the second user U2 or instead of the identification information of the second user U2. The expiration date need not be set in the metadata 9m. Instead of the expiration date, the metadata 9m may include other information used to determine whether or not to keep the original data 9.

At least a part of the metadata 9m may be input by the first user U1 operating the operation reception device 4. The application software 11 may generate at least a part of the metadata 9m based on setting information 20 corresponding to the first user U1. In this case, the application software 11 may include the setting information 20. The application software 11 and the setting information 20 may also be separated.

The original data body 9d is, for example, text data (e.g., message data), image data (still data or moving image data), sound data (e.g., conversation data), and a file including a combination of at least two among the text data, the image data, and the sound data. The original data body 9d is data for which the first user U1 wishes to generate backup data in a state where security is assured.

The original data body 9d may also be, for example, message data exchanged between the first user U1 and the second user U2. The original data body 9d may also be, for example, photographic data or video data of the first user U1 and the second user U2. The original data body 9d may also be, for example, audio data of a recorded conversation between the first user U1 and the second user U2. The original data body 9d may also be, text data describing contents agreed between the first user U1 and the second user U2.

The data acquisition unit 15 stores the acquired original data 9 in the confidential area 7s of the storage device 7 managed by the application software 11.

In the present embodiment, the confidential area 7s is not an area that can be freely accessed by the user U1, but an area that can be accessed in accordance with a system control performed by the OS 10 and the application software 11. The confidential area 7s may, for example, be a dedicated storage area used by the application software 11. Note that the confidential area 7s may also be, for example, an area of a volatile memory, such as a cache memory or a buffer memory.

The encryption unit 16 reads the original data 9 stored in the confidential area 7s and the encryption key 12 corresponding to the first user U1, uses the encryption key 12 to encrypt the original data body 9d of the original data 9, and generates first encrypted data 21.

The first encrypted data 21 includes, for example, first metadata 21m and a first encrypted data body 21d.

The first metadata 21m includes information that indicates attributes or characteristics of the first encrypted data body 21d. The first metadata 21m is, for example, additional information of the first encrypted data body 21d. The first metadata 21m includes identification information of the first encrypted data 21 (e.g., name, data ID, and title), identification information of the original data 9, identification information of the first user U1, identification information of the second user U2, location information of the first encrypted data body 21d corresponding to the first metadata 21m, time data (including, for example, time stamp, generation time of the original data 9, and generation time of the first encrypted data 21), expiration date, and data type of the first encrypted data body 21d.

The first encrypted data body 21d is data obtained by encrypting the original data body 9d using the encryption key 12.

The encryption unit 16 stores the first encrypted data 21 in the confidential area 7s of the storage device 7.

The communication controller 17 transmits a security backup request (in other words, an encryption request) to the second information processing device 3 via the communication device 6.

Then, in the case where a notification indicating that the authentication of the second user U2 was successful at the second information processing device 3 is received from the second information processing device 3 via the communication device 6, the communication controller 17 transmits the first encrypted data 21 stored in the confidential area 7s to the second information processing device 3 via the communication device 6.

The communication controller 17 receives second encrypted data 22 as a response to the security backup request and the first encrypted data 21 from the second information processing device 3 via the communication device 6, and stores the second encrypted data 22 in the storage device 7.

The second encrypted data 22 includes, for example, second metadata 22m and a second encrypted data body 22d.

The second metadata 22m includes information that indicates attributes or the characteristics of the second encrypted data body 22d. The second metadata 22m is, for example, additional information of the second encrypted data body 22d. The second metadata 22m includes identification information of the second encrypted data 22 (e.g., name, data ID, or title), identification information of the first encrypted data 21, identification information of the original data 9, identification information of the first user U1, identification information of the second user U2, location information of the second encrypted data body 22d corresponding to second metadata 22m, time data (including, for example, time stamp, generation time of the original data 9, generation time of the second encrypted data 22, and time in the case where decryption processing is executed with respect to the second encrypted data 22), expiration date, and data type of the second encrypted data body 22d.

The second encrypted data body 22d is data obtained by encrypting the first encrypted data body 21d using an encryption key 23 corresponding to the second user U2.

In the case where the second encrypted data 22 is stored in the storage device 7, the data processing unit 18 deletes the first encrypted data 21 from the confidential area 7s based on the identification information of the first encrypted data 21 included in the second metadata 22m. Note that, in the case where the second encrypted data 22 is stored in the storage device 7, the data processing unit 18 may delete the original data 9 from the confidential area 7s based on the identification information of the original data 9 included in the metadata 22m.

The data processing unit 18 reads the second metadata 22m of the second encrypted data 22 stored in the storage device 7, and determines whether or not the expiration date included in the second metadata 22m has elapsed. In the case where the expiration date has elapsed, the data processing unit 18 deletes the second encrypted data 22 from the storage device 7.

In order to confirm the expiration date, the data processing unit 18 may, for example, read the second metadata 22m at a predetermined cycle, or read the second metadata 22m in response to a request to confirm the expiration date received from the first user U1 via the operation reception device 4.

The data processing unit 18 may check the expiration date of the second metadata 22m and, before the expiration date elapses, execute alert processing (in other words, reminder processing) that informs the first user U1 that the expiration date of the second encrypted data 22 is close to expiring. Specifically, the data processing unit 18 may, for example, cause the display device 5 to display an alert screen including the expiration date and the identification information of the second encrypted data 22 before the expiration date elapses.

The data processing unit 18 may receive an operation to extend the expiration date from the first user U1 via the operation reception device 4.

When the data processing unit 18 receives the operation to extend the expiration date from the first user U1, the expiration date included in the second metadata 22m is updated to a new expiration date.

Alternatively, when the operation of extending the expiration date is received from the first user U1, the data processing unit 18 may transmit an expiration date extension request and the identification information of the second encrypted data 22 to the second information processing device 3 via the communication device 6. In this case, in the case where an extension consent notification and the identification information of the second encrypted data 22 are received from the second information processing device 3 via the communication device 6, the data processing unit 18 updates the expiration date included in the second metadata 22m to a new expiration date.

The data processing unit 18 may receive the expiration date extension request and the identification information of the second encrypted data 22 from the second information processing device 3 via communication device 6. In this case, the data processing unit 18 causes the display device 5 to display a screen including the identification information and the expiration date of the second encrypted data 22, and prompting the first user U1 to determine whether or not he/she consents to the expiration date extension. When consent to the expiration date extension is received from the first user U1, the data processing unit 18 transmits the extension consent notification and the identification information of the second encrypted data 22 to the second information processing device 3 via the communication device 6. Furthermore, in the case where the data processing unit 18 receives the expiration date extension request and the identification information of the second encrypted data 22 from the second information processing device 3 via the communication device 6, and receives consent to the expiration date extension from the first user U1, the expiration date of the second metadata 22m stored in the storage device 7 may be updated to a new expiration date.

The data processing unit 18 updates historical data 24 stored in the storage device 7 based on historical information related to the encryption processing based on the application software 11 described above.

Next, decryption processing executed by the first information processing device 2 is described.

When the application software 11 is started by the processor 8 under the control of the OS 10, the user authentication unit 14 determines whether or not the first user U1 is permitted to use the application software 11.

In the case where it is determined that the first user U1 is permitted to use the application software 11, the data acquisition unit 15 transmits a decryption request to the second information processing device 3 via the communication device 6.

In the case where a notification indicating that the authentication of the second user U2 was successful is received as a response to the decryption request, the data acquisition unit 15 transmits the identification information of the second encrypted data 22 designated by the first user U1 as a decryption target to the second information processing device 3 via the communication device 6. Note that, in the case where the notification indicating that the authentication of the second user U2 was successful is received, the data acquisition unit 15 may transmit the second encrypted data 22 itself, instead of the identification information of the second encrypted data 22, to the second information processing device 3 via the communication device 6.

The data acquisition unit 15 receives the first encrypted data 21 as a response to the decryption request and the identification information of the second encrypted data 22 from the second information processing device 3 via the communication device 6, and stores the first encrypted data 21 in the confidential area 7s.

The decryption unit 19 decrypts the first encrypted data body 21d of the first encrypted data 21 stored in the confidential area 7s based on the decryption key 13 corresponding to the first user U1 stored in the storage device 7, generates decrypted data 25 as a result of the decryption, and stores the decrypted data 25 in the storage device 7.

The decrypted data 25 includes, for example, metadata 25m and a decrypted data body 25d.

The metadata 25m includes information that indicates attributes or characteristics of the decrypted data body 25d. The metadata 25m is, for example, additional information of the decrypted data body 25d. The metadata 25m includes identification information of the decrypted data 25 (e.g., name, data ID, or title), identification information of the second encrypted data 22, identification information of the first encrypted data 21, identification information of the original data 9, identification information of the first user U1, identification information of the second user U2, location information of the decrypted data body 25d corresponding to the metadata 25m, time data (e.g., time stamp, generation time of the original data 9, generation time of the second encrypted data 22, and generation time of the decrypted data 25), expiration date, and data type of the decrypted data body 25d.

The decrypted data body 25d is data obtained by decrypting the first encrypted data body 21d using the decryption key 13 corresponding to the first user U1. The decrypted data body 25d is consistent with the original data body 9d.

In the case where decryption processing is executed with respect to the second encrypted data 22 (in other words, in the case where the second encrypted data 22 is used by the first user U1), the data processing unit 18 may update the expiration date included in the second metadata 22m to a new expiration date or cancel the expiration date.

In the case where the decryption processing is executed with respect to the second encrypted data 22, the data processing unit 18 may delete the first encrypted data 21 from the confidential area 7s, or may delete the second encrypted data 22 stored in the storage device 7.

In the case where the decryption processing is executed with respect to the second encrypted data 22, the data processing unit 18 may add execution time information (e.g., decryption date and time) of the decryption processing with respect to the second encrypted data 22 to the time data of the second metadata 22m of the second encrypted data 22.

The data processing unit 18 updates the historical data 24 stored in the storage device 7 based on the historical information relating to the decryption processing based on the above application software 11.

The second information processing device 3 is described below.

The second information processing device 3 includes an operation reception device 26, a display device 27, a communication device 28, a storage device 29, and a processor 30.

The operation reception device 26 and the display device 27 are the same as the previously described operation reception device 4 and display device 5; therefore, descriptions thereof are omitted.

The communication device 28 is a device that, for example, under the control of the processor 30, performs transmission and reception of data, information, signals, requests, commands, instructions, notifications, calls, or responses wirelessly or in a wired manner to and from, for example, other devices such as the first information processing device 2.

The storage device 29 is one or more memories available to the second information processing device 3. The storage device 29 includes, for example, a nonvolatile memory and a volatile memory. The storage device 29 stores, for example, an OS 31, application software 32, and an encryption key 23 and a decryption key 33 corresponding to the second user U2. The storage device 29 includes a confidential area 29s. The confidential area 29s may, for example, be a dedicated storage area used by the application software 32.

The encryption key 23 may be generated by the second user U2, may, for example, be generated by a component of the second information processing device 3 such as the application software 32, or may be issued by a cryptographic key issuer.

The decryption key 33 may be generated by the second user U2, may, for example, be generated by a component of the second information processing device 3 such as the application software 32, or may be issued by a decryption key issuer.

The OS 31 is executed by the processor 30 and controls various devices provided in the second information processing device 3.

By executing the application software 32, the processor 30 functions as a user authentication unit 34, a data acquisition unit 35, an encryption unit 36, a communication controller 37, a data processing unit 38, and a decryption unit 39.

First, encryption processing executed by the second information processing device 3 is described.

When the OS 31 executed by the processor 30 receives a security backup request from the first information processing device 2 via the communication device 28, the processor 30 starts the application software 32 under the control of the OS 31.

The second information processing device 3 may receive the security backup request after the application software 32 is started.

When the application software 32 is started by the processor 30, the user authentication unit 34 determines whether or not the second user U2 of the information processing device 3 is permitted to use the application software 32. The user authentication unit 34 can use various types of use restriction processing described above to authenticate the second user U2.

In the case where it is determined that the second user U2 is permitted to use the application software 32, the user authentication unit 34 transmits a notification indicating that the authentication of the second user U2 was successful at the second information processing device 3 to the first information processing device 2 via the communication device 28.

As a response to the notification indicating that the authentication of the second user U2 was successful, the data acquisition unit 35 receives the first encrypted data 21 from the first information processing device 2 via the communication device 28, and stores the first encrypted data 21 in the confidential area 29s of the storage device 29.

The encryption unit 36 reads the first encrypted data 21 stored in the confidential area 29s and the encryption key 23 corresponding to the second user U2, uses the encryption key 23 to encrypt the first encrypted data body 21d of the first encrypted data 21, and generates the second encrypted data 22.

The encryption unit 36 stores the second encrypted data 22 in the storage device 29.

The communication controller 37 transmits the second encrypted data 22 stored in the storage device 29 to the first information processing device 2 via the communication device 28.

In the case where the second encrypted data 22 is stored in the storage device 29, the data processing unit 38 deletes the first encrypted data 21 from the confidential area 29s based on the identification information of the first encrypted data 21 included in the second metadata 22m.

The data processing unit 38 reads the second metadata 22m of the second encrypted data 22 stored in the storage device 29, and determines whether or not the expiration date included in the second metadata 22m has elapsed. In the case where the expiration date has elapsed, the data processing unit 38 deletes the second encrypted data 22 from the storage device 29.

In order to confirm the expiration date, the data processing unit 38 may, for example, read the second metadata 22m at a predetermined cycle, or read the second metadata 22m in response to a request to confirm the expiration date received from the second user U2.

The data processing unit 38 may check the expiration date of the second metadata 22m and, before the expiration date elapses, execute alert processing that informs the second user U2 that the expiration date of the second encrypted data 22 is close to expiring.

The data processing unit 38 may receive an operation to extend the expiration date from the second user U2 by the operation reception device 26.

When the data processing unit 38 receives the operation to extend the expiration date from the second user U2, the expiration date included in the second metadata 22m is updated to a new expiration date.

Alternatively, when the operation of extending the expiration date is received from the second user U2, the data processing unit 38 may transmit an expiration date extension request and the identification information of the second encrypted data 22 to the first information processing device 2 via the communication device 28. In this case, in the case where an extension consent notification and the identification information of the second encrypted data 22 are received from the first information processing device 2 via the communication device 28, the data processing unit 38 updates the expiration date included in the second metadata 22m to a new expiration date.

The data processing unit 38 may receive the expiration date extension request and the identification information of the second encrypted data 22 from the first information processing device 2 via the communication device 28. In this case, the data processing unit 38 causes the display device 27 to display a screen including the identification information and the expiration date of the second encrypted data 22, and prompting the second user U2 to determine whether or not he/she consents to the expiration date extension. When consent to the expiration date extension is received from the second user U2, the data processing unit 38 transmits the extension consent notification and the identification information of the second encrypted data 22 to the first information processing device 2 via the communication device 28. Furthermore, in the case where the data processing unit 38 receives the expiration date extension request and the identification information of the second encrypted data 22 from the first information processing device 2 via the communication device 28, and receives consent to the expiration date extension from the second user U2, the expiration date of the second metadata 22m stored in the storage device 29 may be updated to a new expiration date.

The data processing unit 38 updates historical data 40 stored in storage device 29 based on historical information related to the encryption processing based on the application software 32 described above.

Next, decryption processing executed by the second information processing device 3 is described.

When the OS 31 executed by the processor 30 receives a decryption request and the identification information of the second encrypted data 22 from the first information processing device 2 via the communication device 28, the processor 30 starts the application software 32 under the control of the OS 31.

Note that the second information processing device 3 may receive the decryption request and the identification information of the second encrypted data 22 after the application software 32 is started.

When the application software 32 is started by the processor 30, the user authentication unit 34 determines whether or not the second user U2 of the information processing device 3 is permitted to use the application software 32.

In the case where authentication of the second user U2 is successful, the user authentication unit 34 transmits a notification indicating that the authentication of the second user U2 was successful to the first information processing device 2 via the communication device 28.

Note that the user authentication unit 34 may execute processing of reconfirming with the first information processing device 2 of the first user U1 whether or not decryption processing based on the decryption request may be executed. In this case, in the case where the user authentication unit 34 receives the decryption request again from the first information processing device 2 via the communication device 28, the user authentication unit 34 permits the second user U2 to perform the subsequent decryption processing.

In the case where it is determined that the second user U2 is permitted to use the application software 32, the data acquisition unit 35 receives the identification information of the second encrypted data 22 from the first information processing device 2 via the communication device 28.

The decryption unit 39 causes the display device 27 to display a screen including the received identification information of the second encrypted data 22, and prompting the second user U2 to determine whether or not he/she consents to the decryption.

In the case where the decryption unit 39 receives an instruction of consent to the decryption from the second user U2, the decryption unit 39 reads the second encrypted data 22 stored in the storage device 29, uses the decryption key 33 stored in the storage device 29 to decrypt the second encrypted data body 22d of the second encrypted data 22, generates the first encrypted data 21, and stores the first encrypted data 21 in the confidential area 29s of the storage device 29. Alternatively, in the case where the instruction of consent to the decryption is received from the second user U2, the decryption unit 39 may use the decryption key 33 to decrypt the second encrypted data body 22d of the second encrypted data 22 received from the first information processing device 2 via the communication device 28.

The communication controller 37 transmits the first encrypted data 21 stored in the confidential area 29s to the first information processing device 2 via the communication device 28.

In the case where the decryption processing is executed with respect to the second encrypted data 22, the data processing unit 38 may update the expiration date included in the second metadata 22m to a new expiration date or cancel the expiration date.

In the case where the first encrypted data 21 is transmitted to the first information processing device 2 via the communication device 28, the data processing unit 38 may delete the first encrypted data 21 from the confidential area 29s. In the case where the decryption processing is executed with respect to the second encrypted data 22, the data processing unit 38 may delete the second encrypted data 22.

In the case where the decryption processing is executed with respect to the second encrypted data 22, the data processing unit 38 may add execution time information of the decryption processing with respect to the second encrypted data 22 to the time data of the second metadata 22m of the second encrypted data 22 stored in the storage device 29.

The data processing unit 38 updates the historical data 40 stored in the storage device 29 based on historical information related to the decryption processing based on the application software 32 described above.

In this first embodiment, a case in which the second information processing device 3 executes decryption processing based on a decryption request received from the first information processing device 2 is described as an example. However, without receiving the decryption request from the first information processing device 2, the second information processing device 3 may spontaneously decrypt the second encrypted data body 22d of the second encrypted data 22 and generate the first encrypted data 21, and transmit the decryption request to decrypt the first encrypted data 21 and the first encrypted data 21 to the first information processing device 2.

FIG. 2 is a flowchart showing an example of the encryption processing executed by the information processing system 1 according to the first embodiment.

In the first information processing device 2, the processor 8 starts the application software 11 under the control of the OS 10 (S201).

The user authentication unit 14 executes authentication with respect to the first user U1 (S202). In the case where the authentication fails, the processing ends.

In the case where the authentication of the first user U1 is successful, the data acquisition unit 15 acquires the original data 9 and stores the original data 9 in the confidential area 7s (S203).

The encryption unit 16 uses the encryption key 12 corresponding to the first user U1 to encrypt the original data body 9d of the original data 9 stored in the confidential area 7s, generates the first encrypted data 21, and stores the first encrypted data 21 in the confidential area 7s (S204).

In the case where the user authentication is successful with respect to the first user U1, the communication controller 17 transmits a security backup request 56 to the second information processing device 3 via the communication device 6 (S205).

In the case where a notification 57 indicating that the authentication of the second user U2 was successful at the second information processing device 3 is received from the second information processing device 3 via the communication device 6, the communication controller 17 transmits the first encrypted data 21 stored in the confidential area 7s to the second information processing device 3 via the communication device 6 (S206). Note that, in the case where the notification 57 indicating that the authentication of the second user U2 was successful is not received, the processing ends.

In the first embodiment, the generation of the first encrypted data 21 in S204 and the transmission of the security backup request in S205 may be executed in reverse order.

In the first information processing device 2, when the second encrypted data 22 is received from the second information processing device 3 via the communication device 6, the communication controller 17 stores the second encrypted data 22 in the storage device 7 (S207).

The data processing unit 18 deletes the first encrypted data 21 from the confidential area 7s (S208). Note that the data processing unit 18 may delete the original data 9 from the confidential area 7s.

The data processing unit 18 updates the historical data 24 (S209).

In the second information processing device 3, the OS 31 executed by the processor 30 receives the security backup request 56 from the first information processing device 2 via the communication device 28 (S210).

When the security backup request 56 is received, the processor 30 starts the application software 32 (S211).

Note that, in the first embodiment, the reception of the security backup request in S210 and the start of the application software 32 in S211 may be executed in reverse order.

The user authentication unit 34 executes authentication with respect to the second user U2. In the case where it is determined that the second user U2 is permitted to use the application software 32, the user authentication unit 34 transmits the notification 57 indicating that the authentication of the second user U2 was successful to the first information processing device 2 via the communication device 28 (S212). In the case where the authentication fails, the user authentication unit 34 transmits an authentication failure notification to the first information processing device 2 via the communication device 28, and ends the processing.

In the case where the authentication of the second user U2 is successful, the data acquisition unit 35 receives the first encrypted data 21 from the first information processing device 2 via the communication device 28 and stores the first encrypted data 21 in the confidential area 29s (S213).

The encryption unit 36 uses the encryption key 23 corresponding to the second user U2 to encrypt the first encrypted data body 21d of the first encrypted data 21 stored in the confidential area 29s, generates the second encrypted data 22, and stores the second encrypted data 22 in the storage device 29 (S214).

The communication controller 37 transmits the second encrypted data 22 stored in the storage device 29 to the first information processing device 2 via the communication device 28 (S215).

In the case where the second encrypted data 22 is stored in the storage device 29, the data processing unit 38 deletes the first encrypted data 21 from the confidential area 29s (S216).

Note that, in the first embodiment, the transmission of the second encrypted data 22 in S215 and the deletion of the first encrypted data 21 in S216 may be executed in reverse order.

The data processing unit 38 updates the historical data 40 (S217).

FIG. 3 is a flowchart showing an example of the decryption processing executed by the information processing system 1 according to the first embodiment.

In the first information processing device 2, the processor 8 starts the application software 11 (S301).

The user authentication unit 14 executes authentication with respect to the first user U1 (S302).

In the case where the authentication of the first user U1 is successful, the data acquisition unit 15 transmits a decryption request 58 to the second information processing device 3 via the communication device 6 (S303). In the case where the authentication fails, the processing ends.

In the case where a notification 59 indicating that the authentication of the second user U2 was successful is received as a response to the decryption request 58, the data acquisition unit 15 transmits the identification information 60 of the second encrypted data 22 to the second information processing device 3 via the communication device 6 (S304).

The data acquisition unit 15 receives, from the second information processing device 3 via the communication device 6, the first encrypted data 21 in response to the decryption request 58 and the identification information 60 of the second encrypted data 22, and stores the first encrypted data 21 in the confidential area 7s (S305).

The decryption unit 19 decrypts the first encrypted data body 21d of the first encrypted data 21 stored in the confidential area 7s based on the decryption key 13 corresponding to the first user U1 stored in the storage device 7, generates the decrypted data 25 obtained as a result of decrypting, and stores the decrypted data 25 in the storage device 7 (S306).

The data processing unit 18 deletes the first encrypted data 21 from the confidential area 7s (S307).

The data processing unit 18 updates the historical data 24 (S308).

In the second information processing device 3, the OS 31 executed by the processor 30 receives the decryption request 58 from the first information processing device 2 via the communication device 28 (S309).

The processor 30 starts the application software 32 (S310).

Note that, in the first embodiment, the reception of the decryption request 58 in S309 and the start of the application software 32 in S310 may be executed in reverse order.

The user authentication unit 34 executes authentication with respect to the second user U2. In the case where it is determined that the second user U2 is permitted to use the application software 32, the user authentication unit 34 transmits the notification 59 indicating that the authentication of the second user U2 was successful to the first information processing device 2 via the communication device 28 (S311). In the case where the authentication fails, the user authentication unit 34 transmits an authentication failure notification to the first information processing device 2 via the communication device 28 and ends the processing.

In the case where the authentication of the second user U2 was successful, the data acquisition unit 35 receives the identification information 60 of the second encrypted data 22 from the first information processing device 2 via the communication device 28 (S312). Note that, the data acquisition unit 35 may also receive the second encrypted data 22 from the first information processing device 2 via the communication device 28 and store it in storage device 29.

The decryption unit 39 determines whether or not consent to decrypt the second encrypted data 22 is received from the second user U2 (S313). In the case where the consent for decryption is not received, the decryption unit 39 transmits a decryption failure notification to the first information processing device 2 via the communication device 28 and ends the processing.

In the case where the consent for decryption is received from the second user U2, the decryption unit 39 uses the decryption key 33 corresponding to the second user U2 stored in the storage device 29 to decrypt the second encrypted data body 22d of the second encrypted data 22 stored in the storage device 29, generates the first encrypted data 21, and stores the first encrypted data 21 in the confidential area 29s of the storage device 29 (S314).

The communication controller 37 transmits the first encrypted data 21 stored in the confidential area 29s to the first information processing device 2 via the communication device 28 (S315).

The data processing unit 38 deletes the first encrypted data 21 from the confidential area 29s (S316).

The data processing unit 38 updates the historical data 40 (S317).

Note that, in the case where the second user U2 wishes to decrypt the second encrypted data 22, the first information processing device 2 executes the processing of the second information processing device 3 in FIG. 3, and the second information processing device 3 executes the processing of the first information processing device 2 in FIG. 3.

FIG. 4 is a flowchart showing an example of expiration date extension processing executed by the information processing system 1 according to the first embodiment.

In the case where an instruction to extend the expiration date of the second encrypted data 22 is received from the first user U1 via the operation reception device 4 (S401), the data processing unit 18 of the first information processing device 2 transmits an expiration date extension request 73 and the identification information 60 of the second encrypted data 22 to the second information processing device 3 via the communication device 6 (S402).

When an extension consent notification 74 and the identification information 60 of the second encrypted data 22 are received from the second information processing device 3 via the communication device 6 (S403), the data processing unit 18 of the first information processing device 2 updates the expiration date of the metadata 22m of the second encrypted data 22 stored in the storage device 7 (S404).

When the expiration date extension request 73 and the identification information 60 of the second encrypted data 22 are received from the first information processing device 3 via the communication device 28 (S405), the data processing unit 38 of the second information processing device 3 causes the display device 27 to display an inquiry as to whether or not the second user U2 consents to extend the expiration date of the second encrypted data 22 (S406).

In the case where an operation to consent to the extension of the expiration date for the second encrypted data 22 is received from the second user U2 via the operation reception device 26 (S407), the data processing unit 38 of the second information processing device 3 updates the expiration date of the second metadata 22m of the second encrypted data 22 stored in the storage device 29 (S408).

In addition, in the case where the operation to consent to the extension of the expiration date is received from the second user U2 via the operation reception device 26, the data processing unit 38 of the second information processing device 3 transmits the extension consent notification 74 and the identification information 60 of the second encrypted data 22 to the first information processing device 2 via the communication device 28 (S409). In the case where the consent to the extension is not received, the data processing unit 38 transmits a non-extension notification to the first information processing device 2 via the communication device 28 and ends the processing.

Note that, in the first embodiment, the update of the expiration date in S408 and the transmission of the extension consent notification 74 and the identification information 60 of the second encrypted data 22 in S409 may be executed in reverse order.

FIG. 5 shows an example of the relationship between the original data 9, the first encrypted data 21, and the second encrypted data 22 according to the first embodiment.

The original data 9 includes the metadata 9m and the original data body 9d. The metadata 9m includes identification information 61 of the original data 9, identification information 62 of the first user U1, identification information 63 of the second user U2, location information 64 of the original data body 9d corresponding to the metadata 9m, time data 65, expiration date 66, and data type 67 of the original data body 9d.

The first encrypted data 21 includes the first metadata 21m and the first encrypted data body 21d. The first metadata 21m includes identification information 68 of the first encrypted data 21, the identification information 61 of the original data 9, the identification information 62 of the first user U1, the identification information 63 of the second user U2, location information 69 of the first encrypted data body 21d corresponding to the first metadata 21m, the time data 65, the expiration date 66, and data type 70 of the first encrypted data body 21d.

The second encrypted data 22 includes the second metadata 22m and the second encrypted data body 22d. The second metadata 22m includes the identification information 60 of the second encrypted data 22, identification information 68 of the first encrypted data 21, the identification information 61 of the original data 9, the identification information 62 of the first user U1, the identification information 63 of the second user U2, location information 71 of the second encrypted data body 22d corresponding to the second metadata 22m, the time data 65, the expiration date 66, and data type 72 of the second encrypted data body 22d.

The identification information 60 of the second encrypted data 22 includes, for example, a data ID and a title.

The time data 65 may include, for example, encryption date and time, or may include the previous decryption date and time.

The identification information 63 of the second user U2 represents, for example, a transmission destination of a decryption request.

In the first embodiment, by referring to the first metadata 21m of the first encrypted data 21, the first information processing device 2 and the second information processing device 3 can recognize the original data 9 associated with the first encrypted data 21.

In the first embodiment, by referring to the second metadata 22m of the second encrypted data 22, the first information processing device 2 and the second information processing device 3 can recognize the original data 9 and the first encrypted data 21 associated with the second encrypted data 22.

In the first embodiment, since the metadata 9m of the original data 9, the first metadata 21m of the first encrypted data 21, and the second metadata 22m of the second encrypted data 22 include the identification information 62 of the first user U1 and the identification information 63 of the second user U2, it is possible to prevent the original data 9, the first encrypted data 21, and the second encrypted data 22 from being used by an unauthorized user. In addition, the metadata 9m of the original data 9, the first metadata 21m of the first encrypted data 21, the second metadata 22m of the second encrypted data 22 that are associated to each other can be distinguished from other groups of data by including a unique identifier (in other words, a number in common).

In the first embodiment, the metadata 25m of the decrypted data 25 may also include at least a part of the information included in the first metadata 21m of the first encrypted data 21.

In the first embodiment described above, the first user U1 and the second user U2 having a trust relationship cooperate with each other to perform double encryption on the original data 9 using separate encryption keys 12 and 23, and the first user U1 and the second user U2 both own the second encrypted data 22. In the case of decrypting the second encrypted data 22, the first user U1 asks the second user U2 for cooperation in decryption. In the case where consent for decryption is obtained from the second user U2, the first user U1 and the second user U2 cooperate with each other using separate decryption keys 13 and 33 to decrypt the second encrypted data 22.

As a result, the first user U1 can have a reliable second user U2 own the double-encrypted backup data. This backup data cannot be decrypted without the cooperation of the first user U1 and the second user U2. In the first embodiment, the two-factor authentication is realized by multiple users U1 and U2, thereby improving the security of the data and preventing data loss from occurring.

In the first embodiment, the first user U1 does not have to know the second user U2 who owns the decryption key 33. For example, the storage device 7 of the first information processing device 2 stores a list containing identification information of a plurality of reliable users (natural or legal person), and the first information processing device 2 may randomly or according to predetermined rules select the identification information of the second user U2 from among the identification information of the users included in the list. In this case, instead of the first user U1 selecting the second user U2, the first information processing device 2 will automatically select the second user U2. As a result, since it becomes difficult for the first user U1 and a third party who is not the first user U1 to grasp the other party (second user U1) to whom the backup data is deposited and the data decryption is to be requested, the security of the second encrypted data 22 is increased.

In the first embodiment, the original data body 9$d$ may include various types of information that the first user U1 does not want to be known to others, but wants to manage collectively, such as deposit account numbers, key numbers, and various passwords. The first user U1 can have a reliable second user U2 store backup data (second encrypted data 22) of information such as deposit account numbers, key numbers, and various passwords. In addition, the backup data to be stored by the second user U2 cannot be decrypted unless the first user U1 and the second user U2 cooperate with each other. Therefore, the security of the backup data can be ensured.

In the first embodiment, the first user U1 may own the second information processing device 3 instead of the second user U2. In other words, both the first information processing device 2 and the second information processing device 3 may be owned by the first user U1.

In the first embodiment, three or more information processing devices may be linked together, and three or more layers of encryption may be executed on the original data 9. In this case, data security can be further improved.

In the first embodiment, the user authentication used in the first information processing device 2 and the user authentication used in the second information processing device 3 may be different types of authentication. For example, the first information processing device 2 may authenticate the first user U1 with a password, the second information processing device 3 may authenticate the second user U2 with biometric authentication, a third information processing device may authenticate a third user using user authentication information stored in an integrated circuit. In this case, data security can be further improved.

In the first embodiment, in the case where the expiration date of the second encrypted data 22 has elapsed, the second encrypted data 22 can be deleted from the storage devices 7 and 29. Furthermore, in the first embodiment, the expiration date of the second encrypted data 22 can be extended in response to the instruction of the expiration date extension from the first user U1 or the second user U2, or in a case where both the first user U1 and the second user U2 consent to the expiration date extension. This means that, in the case where the trust relationship between the first user U1 and the second user U2 is lost, the second encrypted data 22 can be prevented from being decrypted, and the second encrypted data 22 can be deleted.

In the first embodiment, the original data 9 includes the metadata 9$m$ that includes information necessary for processing the original data 9. The first encrypted data 21 includes the first metadata 21$m$ including information necessary for processing the first encrypted data 21. The second encrypted data 22 includes the second metadata 22$m$ including information necessary for processing the second encrypted data 22. Thus, by attaching the information necessary for processing to each data, the first information processing device 2 and the third information processing device 3 can perform data processing efficiently.

The various components provided in the information processing system 1 according to the first embodiment may be combined or divided as necessary. For example, the application software 11 and the application software 32 may be combined into one. For example, the data acquisition unit 15, the communication controller 17, and the data processing unit 18 may be combined. For example, the data acquisition unit 35, the communication controller 37, and the data processing unit 38 may be combined. For example, the data acquisition unit 15, the encryption unit 16, and the communication control unit 17 may be combined. For example, the data acquisition unit 35, the encryption unit 36, and the communication controller 37 may be combined.

In the first embodiment, the first user U1 may be a natural person or a legal person. Similarly, the second user U2 may be a natural person or a legal person.

In the first embodiment, the communication between the first information processing device 2 and the second information processing device 3 may be performed directly, via a network, or via one or more servers.

In the information processing system 1 according to the first embodiment, data is transmitted and received between the first information processing device 2 and the second information processing device 3. Furthermore, the first information processing device 2 and the second information processing device 3 store data in the storage device 7 and the storage device 29, respectively. However, the information processing system 1 may also include a private storage area corresponding to the first information processing device 2, a private storage area corresponding to the second information processing device 3, and a public storage area shared by both the first information processing device 2 and the second information processing device 3. The information processing system 1 may realize the same processing described in the first embodiment by writing or reading data to or from these storage areas.

Second Embodiment

In a second embodiment, at least some functions of the information processing system 1 according to the first embodiment described above are realized by a server. Note that the server may be various dedicated devices, storage devices with data storage media, or database systems.

Figure 6:
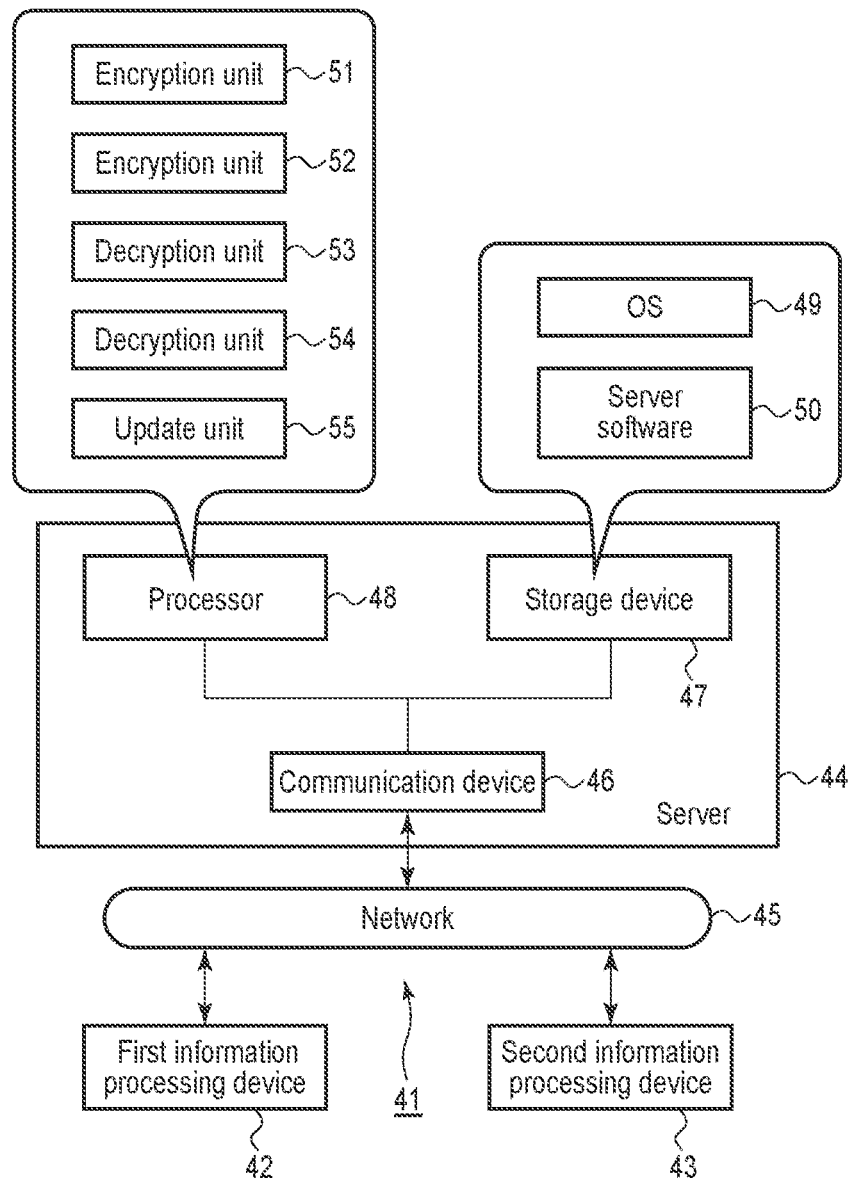
FIG. 6 is a block diagram illustrating an example of a configuration of an information processing device according to a second embodiment.

FIG. 6 is a block diagram showing an example of an information processing system 41 according to the second embodiment.

The information processing system 41 includes a first information processing device 42, a second information processing device 43, and a server 44. The first information processing device 42, the second information processing device 43, and the server 44 can communicate data, information, signals, requests, commands, instructions, notifications, calls, or responses to each other via a network 45. The first information processing device 42 may transmit and receive data to and from the second information processing device 43 via the network 45 and the server 44.

In the second embodiment, the first information processing device 42 includes some components of the first information processing device 2 described above. The other components of the first information processing device 2 described above are provided in the server 44.

The second information processing device 43 includes some components of the second information processing device 3 described above. The other components of the second information processing device 3 described above are provided in the server 44.

The server 44 includes, for example, a communication device 46, a storage device 47, and a processor 48.

The communication device 46 is a device that, for example, under the control of the processor 48, performs transmission and reception of data, information, signals, requests, commands, instructions, notifications, calls, or responses wirelessly or in a wired manner to and from, for example, other devices such as the first information processing device 42 or the second information processing device 43.

The storage device 47 includes, for example, a nonvolatile memory and a volatile memory. The storage device 47 stores, for example, an OS 49 and server software 50 executable on the OS 49.

By executing the OS 49 and the server software 50, the processor 48 functions as an encryption unit 51, an encryption unit 52, a decryption unit 53, a decryption unit 54, and an update unit 55.

The encryption unit 51 executes the same processing as the above encryption unit 16 by the server 44. Specifically, the encryption unit 51 receives original data 9 and an encryption key 12 from the first information processing device 42 via the network 45 and the communication device 46. The encryption unit 51 then encrypts an original data body 9d of the original data 9 using the encryption key 12 and generates first encrypted data 21.

Note that the encryption key 12 is stored in the storage device 47 of the server 44, and the encryption unit 51 may use the encryption key 12 stored in the storage device 47 without receiving the encryption key 12 from the first information processing device 42.

The encryption unit 52 executes the same processing as the above encryption unit 36 by the server 44. Specifically, the encryption unit 52 receives an encryption key 23 from the second information processing device 43 via the network 45 and the communication device 46, encrypts a first encrypted data body 21d of first encrypted data 21 using the encryption key 23, and generates second encrypted data 22. The encryption unit 52 then transmits the second encrypted data 22 to the first information processing device 42 and the second information processing device 43 via the communication device 46 and the network 45.

Note that the encryption key 23 is stored in the storage device 47 of the server 44, and the encryption unit 52 may use the encryption key 23 stored in the storage device 47 without receiving the encryption key 23 from the first information processing device 43.

The decryption unit 53 executes the same processing as the above decryption unit 39 by the server 44. Specifically, in the case where a second user U2 consents to decrypt the second encrypted data 22, the decryption unit 53 receives the second encrypted data 22 and a decryption key 33 from the second information processing device 43 via the network 45 and the communication device 46. The decryption unit 53 then decrypts second encrypted data 22d of the second encrypted data 22 using the decryption key 33, and generates the first encrypted data 21.

Note that the decryption key 33 is stored in the storage device 47 of the server 44, and the decryption unit 53 may use the decryption key 33 stored in storage device 47 without receiving the decryption key 33 from the second information processing device 43.

The decryption unit 54 executes the same processing as the above decryption unit 19 by the server 44. Specifically, the decryption unit 54 receives a decryption key 13 from the first information processing device 42 via the network 45 and the communication device 46, decrypts the first encrypted data body 21d of the first encrypted data 21 using the decryption key 13, and generates decrypted data 25. The decryption unit 54 then transmits the decrypted data 25 to the first information processing device 42 via the communication device 46 and the network 45.

Note that the decryption key 13 is stored in the storage device 47 of the server 44, and the decryption unit 54 may use the decryption key 13 stored in the storage unit 47 without receiving the decryption key 13 from the first information processing device 42.

In a case where an update request is received from the first information processing device 42 or the second information processing device 43 via the network 45 and the communication device 46, the update unit 55 updates versions of the application software of the first information processing device 42 or the application software of the second information processing device 43. The update request may be, for example, a message indicating that the first user U1 or the second user U2 has agreed to the billing.

In the second embodiment described above, the application software of the first information processing device 42 and the application software of the second information processing device 43 can be simplified in comparison to the case of the first embodiment described above, and the processing load on the first information processing device 42 and the second information processing device 43 can be reduced.

Furthermore, in the second embodiment, the application software of the first information processing device 42 or the application software of the second information processing device 43 can be updated to versions the first user U1 and the second user U2 desire, and an operator of the server 44 can improve the quality of service provided to the first user U1 or the second user U2 depending on the billing agreement.

In the second embodiment, a case in which the first information processing device 42 and the second information processing device 43 execute the encryption processing and the decryption processing in cooperation with the server 44 is explained as an example. However, one of the first information processing device 42 and the second information processing device 43 needs to cooperate with the server 44, and the other may not have to cooperate with the server 44.

For example, the server 44 may include the encryption unit 51 and the decryption unit 54, and the second information processing device 43 may include the encryption unit 52 and the decryption unit 53. In this case, the server 44 performs the encryption processing of the original data 9 and the decryption processing of the first encrypted data 21 in response to a request from the first information processing device 42. The second information processing device 43 performs the encryption processing of the first encrypted data 21 and the decryption processing of the second encrypted data 22.

For example, the server 44 may include the encryption unit 52 and the decryption unit 53, and the first information processing device 42 may include the encryption unit 51 and the decryption unit 54. In this case, the first information processing device 42 performs encryption processing of the original data 9 and the decryption processing of the first encrypted data 21. The server 44 performs the encryption processing of the first encrypted data 21 and the decryption processing of the second encrypted data 22 in response to a request from the second information processing device 43.

In the second embodiment, the first information processing device 42 may cooperate with a first server, and the second information processing device 43 may cooperate with a second server. For example, the first server includes the encryption unit 51 and the decryption unit 54, and the second server includes the encryption unit 52 and the decryption unit 53. The first server performs the encryption processing of the original data 9 and decryption of the first encrypted data 21 in response to a request from the first information processing device 42. The second server performs encryption processing of the first encrypted data 21 and decryption of the second encrypted data 22 in response to a request from the second information processing device 43.

Third Embodiment

In a third embodiment, application examples of the above first and second embodiments above will be described.

<3-1> First Application Example

In information processing systems 1 and 41, a first information processing device 2 owned by a first user U1 transmits to a second information processing device 3 owned by a reliable second user U2, such as a family member, first encrypted data 21 in which a deposit account number, a key number, and a list of various passwords, etc., are encrypted. The second information processing device 3 further encrypts the first encrypted data 21 and generates second encrypted data 22. Each of the first information processing device 2 and the second information processing device 3 stores the second encrypted data 22. In the application example, the first user U1 can obtain the cooperation of the second user U2 relating to storing the list as described above, and the list can be prevented from being viewed by the second user U2 without the consent of the first user U1.

<3-2> Second Application Example

Information processing systems 1 and 41 prevent a first user U1 from freely using original data 9, and, in the case where the first user U1 desires to use the original data 9, consent of a second user U2 is required. Therefore, for example, without the consent of the second user U2, the first user U1 is unable to view information stored as a second encrypted data body 22d of second encrypted data 22. For example, even if the first user U1, who is an elderly person, attempts to decrypt the second encrypted data body 22d of the second encrypted data 22, the first user U1 is unable to decrypt the second encrypted data body 22d without the consent of the second user U2. By managing important information, such as account numbers, in the information processing systems 1 and 41, even if the first user U1 attempts to notify important information to a third party, it is possible to prevent the important information from being leaked to the third party by the second user U2 not consenting to the decryption. For example, the first user U1 can be prevented from becoming a victim of special fraud.

<3-3> Third Application Example

A first user U1 and a second user U2 may be a natural person or a legal person. The reliable second user U2 may perform second encryption for commercial, business, or for-profit purposes. For example, a qualified person or expert such as a lawyer, a judicial scrivener, a certified accountant, or a tax accountant can use information processing systems 1 and 41 as a service for storing confidential data at the request of the first user U1. As the second user U2, a financial institution such as a bank may use the information processing systems 1 and 41 to store data related to the property of the first user U1. As the second user U2, a government office, a local government, a public interest corporation, or the like may use the information processing systems 1 and 41 as a service for storing the data of the first user U1 for the purpose of welfare. The first user U1 can prevent unauthorized use of the deposited data, and can prevent the privacy of the first user U1 from being violated.

<3-4> Fourth Application Example

A first user U1 may operate a first information processing device 2 and a second information processing device 3, or a first information processing device 42 and a second information processing device 43 alone. In this case, since it is necessary for the first user U1 alone to manage second encrypted data 22 by different devices and decrypt the second encrypted data 22 by two devices, the security of data can be enhanced.

<3-5> Fifth Application Example

In the case where a first user U1 and a second user U2 are in a relationship as friends or a family, the first user U1 and the second user U2 may store video data taken together or audio (conversation) data recorded together as data that can be used only by the two users. This prevents private video data or audio data from being leaked to third parties.

By setting an expiration date for second encrypted data 22, the first user U1 can automatically delete the second encrypted data 22 with the elapse of the expiration date. The expiration date may be updated or cancelled by generating decrypted data 25 from the second encrypted data 22. This allows the trust relationship between the first user U1 and the second user U2 to be reviewed at regular intervals; and, in a case where the trust relationship cannot be maintained, the second encrypted data 22 can be automatically deleted.

<3-6> Sixth Application Example

For the purpose of counselling, a first user U1 may consult with a second user U2, such as a doctor or a counselor, for personal problems, and deposit data such as sentences, audio, and video recording the content thereof with the second user U2. The content of counseling, which is related to the privacy of the first user U1, can be safely entrusted to a reliable second user U2. The first user U1 can feel secure in receiving counseling and does not have to be concerned about data leakage. In the present application example, the psychological burden of the first user U1 can be reduced while protecting the privacy of the first user U1.

<3-7> Seventh Application Example

For example, information processing systems 1 and 41 are used in a case where a first user U1 is a testator, a will preparer, or an end note preparer, and entrusts a dying wish, a will, or an end note to a second user U2 and a third user. In the present application example, the first user U1 and the second user U2 execute double encryption with respect to original data 9. Subsequently, the first user U1 transmits his/her decryption key 13 to the third user. Instead of the decryption key 13, a password or authentication information stored in an integrated circuit may be used. The first user U1 may also pass a device storing the decryption key 13 to the third user. After the death of the first user U1, the second user U2 or the third user starts decryption of second encrypted data 22, and the third user performs the decryption using the decryption key 13 on behalf of the first user U1.

<3-8> Eighth Application Example

A personal number (for example, my number, social security number, or tax number) is important information that identifies an individual. In the case of using a personal number, the personal number must be communicated to the other party. The storage of personal numbers is the responsibility of the individual.

For example, a first user U1 may be the issuing entity or the managing entity of the personal number. A second user U2 may be the individual to whom the personal number is assigned. In information processing systems 1 and 41, a first information processing device 2 of the first user U1 transmits first encrypted data 21 in which the personal number is encrypted to a second information processing device 3 of the second user U2. The second information processing device 3 executes an encryption with respect to the first encrypted data 21, and generates second encrypted data 22. The first information processing device 2 and the second information processing device 3 then store the second encrypted data 22.

Suppose, for example, a third information processing device of a third user who requires a personal number, such as a tax office, requests the second information processing device 3 to submit the personal number. In this case, the second information processing device 3 transmits the first encrypted data 21 obtained by performing decryption with respect to the second encrypted data 22 to the third information processing device. The third information processing device requests the user U1 who operates the first information processing device 2 to consent to the use of the personal number of the second user U2. The first user U1 confirms the purpose of use of the third user. In the case where the purpose of use is legitimate, the first information processing device 2 transmits a decryption key 13 to the third information processing device. The third information processing device uses the decryption key 13 to decrypt the first encrypted data 21 received from the second information processing device 3, and acquires the personal number of the second user U2 as decrypted data 25.

As a result, the personal number of the second user U2 is strictly managed and can be used by the third user in a case where the purpose of use is confirmed as legitimate by the first user U1.

In the present application example, in the case where the data is to be used repeatedly, the second information processing device 3 may provide the third information processing device with the second encrypted data 22 in advance. In this case, each time the data is used, the first user U1 confirms the purpose of use of the third user, and, in the case where the purpose of use is legitimate, the second information processing device 3 and the third information processing device execute a two-step decryption with respect to the second encrypted data 22.

<3-9> Ninth Application Example

At a point in time before an expiration date elapses, first information processing devices 2 and 42 provide a message to a first user U1 to prompt decryption. Note that the first information processing devices 2 and 42 may also transmit a message to second information processing devices 3 and 43 to prompt decryption, and the second information processing device 3 and 43 may provide a message to a second user U2 to prompt decryption.

In the case where the first user U1 and the second user U2 consent to decrypt second encrypted data 22, the first information processing devices 2 and 42 and the second information processing devices 3 and 42 cooperate to decrypt the second encrypted data 22.

This allows the second encrypted data 22 to be used as a time capsule.

<3-10> Tenth Application Example

For example, information processing systems 1 and 41 can be used for voice recording data for corporate sales or customer service correspondence. Suppose that a first user U1 is a company and a second user U2 is a customer. Since a second encrypted data body 22d of second encrypted data 22 is double-encrypted, it cannot be decrypted unless the first user U1 and the second user U2 consent thereto. In a case where it is necessary to confirm the contents of the second encrypted data body 22d in an audit, etc., the first user U1 and the second user U2 jointly decrypt the second encrypted data body 22d of the second encrypted data 22, and pass decrypted data 25 to an auditor. In the present application example, the company can pass the data to the auditor with the consent of the customer.

<3-11> Eleventh Application Example

Since video and audio data from cameras intended for surveillance, such as security cameras or drive recorders, will be used to monitor a filmed person such as employees, protecting the privacy of the filmed person becomes an issue. Information processing systems 1 and 41 store data with the consent of a first user U1 and a second user U2 who is the filmed person, and the data can be referred to by the consent. This allows the privacy of the filmed person to be protected.

<3-12> Twelfth Application Example

Suppose that, for example, an original data body 9d of original data 9 to be encrypted include message data transmitted or received between first information processing devices 2 and 42 and second information processing devices 3 and 43. The first information processing devices 2 and 42 and the second information processing devices 3 and 43 automatically double encrypt, for example, at least one message data after a certain amount of time has elapsed from a certain reference time (e.g., a time stamp of the message data). Alternatively, the first information processing devices 2 and 42 and the second information processing devices 3 and 43 automatically double encrypt at least one message data transmitted or received from the start to the end of a communication connection between the first information processing devices 2 and 42 and the second information processing devices 3 and 43. As the communication connection, for example, a session, a connection, a path, a link, or the like is used.

The first information processing devices 2 and 42 and the second information processing devices 3 and 43 delete the message data exchanged between the first information processing devices 2 and 42 and the second information processing devices 3 and 43 on condition that they are doubly encrypted.

Furthermore, in a case where a certain period of time has elapsed since second encrypted data 22 was generated (in a case where an expiration date has elapsed), the first information processing devices 2 and 42 and the second information processing devices 3 and 43 automatically delete the second encrypted data 22.

In order to doubly decrypt the once double-encrypted second encrypted data 22, the consent of two people such as a first user U1 and a second user U2 is necessary. Furthermore, the consent of two people is also necessary in the case of canceling the automatic deletion.

In the case where the message data is transmitted and received between multiple devices, even if the message data is deleted on one device, the message data may remain on the other device. However, in the case of using the present application example, if consent cannot be obtained between the first user U1 and the second user U2, the message data of both will be deleted.

Encryption processing of the present application example is described in more detail below.

Figure 7:
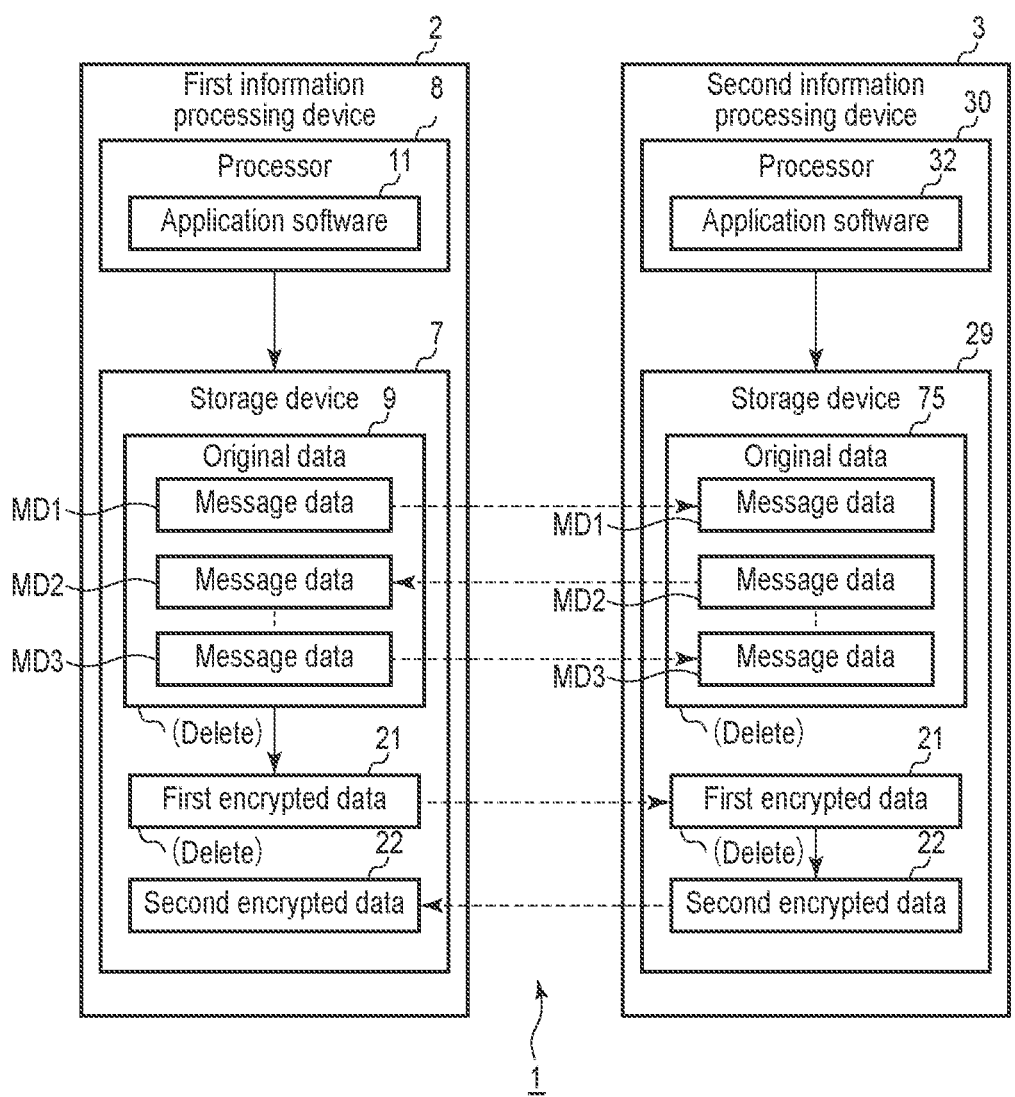
FIG. 7 is a block diagram showing an example of a configuration of an information processing system according to an eighth application example of a third embodiment.

FIG. 7 is a block diagram showing an example of a configuration of an information processing system 1 according to the present application example. In FIG. 7, only the components of the information processing system 1 that are necessary for explanation are illustrated, and those that are not necessary for explanation are omitted.

In the present application example, application software 11 executed by a processor 8 and application software 32 executed by a processor 30 are message exchange software.

In FIG. 7, the processor 8 of the first information processing device 2 executes the application software 11. The processor 30 of the second information processing device 3 executes the application software 32. Thereby, the processor 8 and the processor 30 execute the following processing.

Suppose the processor 8 transmits message data MD1 to the second information processing device 3, receives message data MD2 from the second information processing device 3, and transmits message data MD3 to the second information processing device 3. The processor 8 stores the original data 9 including the message data MD1 to MD3 in a storage device 7.

The processor 30 receives the message data MD1 from the first information processing device 2, transmits the message data MD2 to the first information processing device 2, and receives the message data MD3 from the first information processing device 2. The processor 30 stores original data 75 including the message data MD1 to MD3 in a storage device 29.

For example, when a predetermined amount of time has elapsed since the original data 9 was generated, or when the message exchange (e.g., session) between the first information processing device 2 and the second information processing device 3 ends, the processor 8 uses an encryption key 12 to generate first encrypted data 21 from the original data 9, causes the first encrypted data 21 to be stored in a confidential area 7s, transmits the first encrypted data 21 to the second information processing device 3, and deletes the original data 9 and the first encrypted data 21 in the confidential area 7s.

When the first encrypted data 21 is received from the first information processing device 2, the processor 30 causes the first encrypted data 21 to be stored in a confidential area 29s, uses an encryption key 23 to generate second encrypted data 22 from the first encrypted data 21, causes the second encrypted data 22 to be stored in the storage device 29, transmits the second encrypted data 22 to the first information processing device 2, and deletes the first encrypted data 21 in the confidential area 29s.

Furthermore, the processor 30 deletes the original data 75, for example, in a case where a predetermined amount of time has elapsed since the original data 75 was generated, in a case where the first encrypted data 21 corresponding to the original data 75 is received from the first information processing device 2, in a case where the second encrypted data 22 corresponding to the original data 75 is generated, in a case where the second encrypted data 22 is transmitted to the first information processing device 2, or in a case where the message exchange (e.g., session) between the first information processing device 2 and the second information processing device 3 is ended.

In the present application example described above, the message data MD1 to MD3 exchanged by the application software 11 and the application software 32 can be prevented from leakage against the will of the first user U1 and the second user U2.

Furthermore, in the present application example, the second encrypted data 22 and its backup data can be held in the first information processing device 2 and the second Information processing device 3.

Fourth Embodiment

In a fourth embodiment, an example of a screen to be displayed on a display device 5 of a first information processing device 2 during decryption processing is described.

Figure 8:
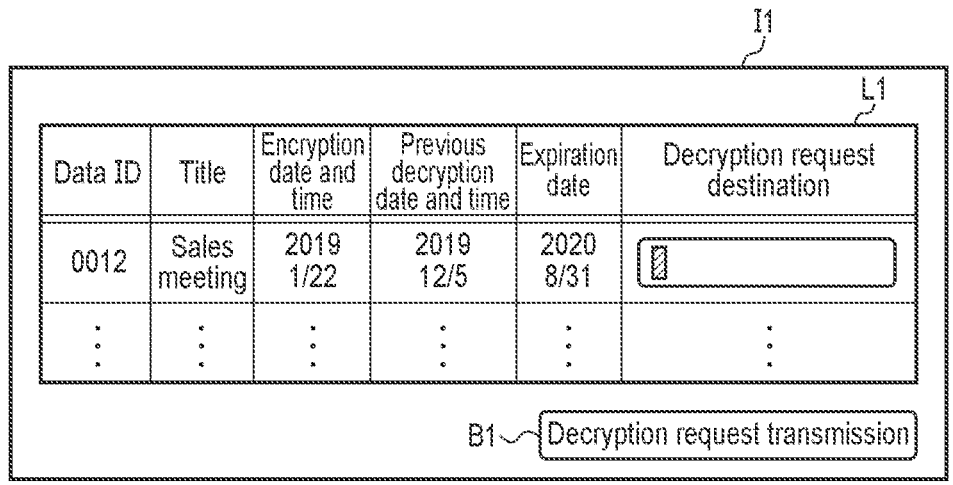
FIG. 8 is a view illustrating an example of a first screen displayed by a first information processing device according to a fourth embodiment.

FIG. 8 shows an example of a first screen I1 displayed by the first information processing device 2 according to the fourth embodiment.

The display device 5 of the first information processing device 2 displays the screen I1 during the decryption processing under the control of a processor 8 executing application software 11.

The screen I1 prompts a first user U1 to designate second encrypted data 22 of a decryption target. The screen I1 includes a list L1 of information relating to a plurality of second encrypted data 22 stored in a storage device 7.

This screen I1 does not display decryption request destinations for each of the plurality of second encrypted data 22. The first user U1 inputs the decryption request destination using an operation reception device 4 and presses a decryption request transmission button B1.

When the processor 8 receives the input of the decryption request destination from the first user U1 via the operation reception device 4, the processor 8 determines whether or not the received decryption request destination is consistent with identification information 63 of a second user U2 included in second metadata 22*m* of the second encrypted data 22 to which the decryption request destination is input.

In the case where the decryption request destination and the identification information 63 of the second user U2 are consistent, the processor 8 transmits a decryption request 58 to the decryption request destination (i.e., a second information processing device 3) of the second encrypted data 22. In the case where they are inconsistent, the processor 8 notifies the first user U1 that the input of the decryption request destination is inappropriate.

Figure 9:
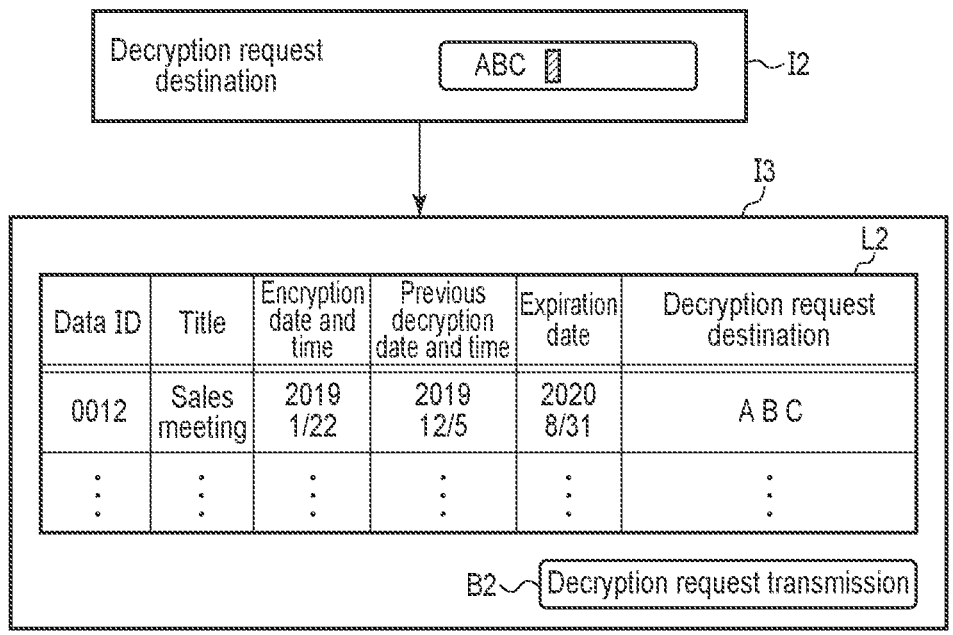
FIG. 9 is a view illustrating an example of second and third screens displayed by the first information processing device according to the fourth embodiment.

FIG. 9 shows an example of second and third screens I2 and I3 displayed by the first information processing device 2 according to the fourth embodiment.

The display device 5 of the first information processing device 2 displays the screen I2, then the screen I3, during the decryption processing under the control of the processor 8 executing the application software 11.

The screen I2 prompts the first user U1 to input the decryption request destination. The first user U1 inputs the decryption request destination using the operation reception device 4.

The processor 8 then extracts the second encrypted data 22 stored in the storage device 7 and including the identification information 63 of the second user U2 that is consistent with the input decryption request destination, and causes the display device 5 to display the screen I3 including a list L2 of the extracted second encrypted data 22. More specifically, in the case where the identification information 63 of the second user U2 included in the second metadata 22*m* of the second encrypted data 22 is consistent with the input decryption request destination, the processor 8 extracts this second encrypted data 22.

The processor 8 then receives the designation with respect to one of the second encrypted data 22 included in the list L2 via the operation reception device 4, and receives the pressing of a decryption request transmission button B2.

The processor 8 then transmits the decryption request 58 and the identification information 60 of the designated second encrypted data 22 to the decryption request destination (i.e., the second information processing device 3 of the second user U2) of the designated second encrypted data 22, and starts the decryption processing for the designated second encrypted data 22.

In the fourth embodiment described above, the decryption request destination is not displayed at the start of the decryption processing, and the first user U1 is requested to input the decryption request destination.

As a result, it is possible to prevent another user who is not the first user U1 from transmitting the decryption request to the second information processing device 3 by using the first information processing device 2. Thus, an unauthorized user cannot easily decrypt the second encrypted data 22, and data security can be ensured.

Fifth Embodiment

In a fifth embodiment, an information processing system 1 that ensures the security of data transmitted and received by data exchange software is described.

FIG. 10 is a block diagram showing an example of a configuration of the information processing system 1 according to the fifth embodiment.

Figure 11:
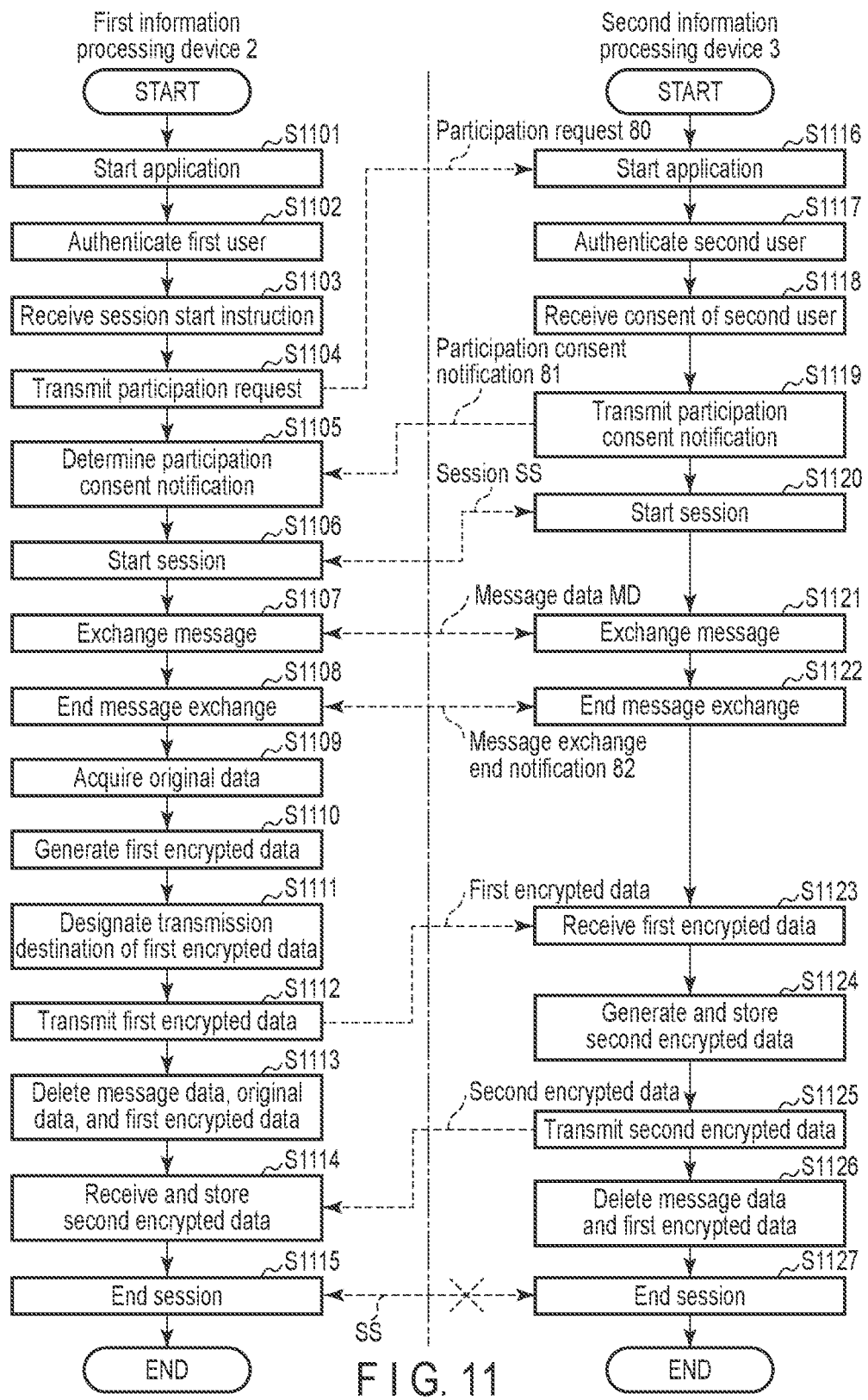
FIG. 11 is a flowchart illustrating an example of encryption processing executed by the information processing device according to the fifth embodiment.

FIG. 11 is a flowchart showing an example of encryption processing executed by the information processing system 1 according to the fifth embodiment.

In the fifth embodiment, a case in which at least one message data MD is transmitted or received between a first information processing device 2 and a second information processing device 3 is described as an example. However, instead of the message data MD, for example, various types of data, such as text data, sound data, image data, or any combination of these may be transmitted and received between the first information processing device 2 and the second information processing device 3.

In the fifth embodiment, the encryption processing executed by the information processing system 1 is described. Since the decryption processing described in the first embodiment above, for example, can be applied to decryption processing executed by the information processing system 1, the description is omitted.

In the fifth embodiment, the communication between the first information processing device 2 and the second information processing device 3 are managed in a certain unit from start to end.

Examples of units that manage communication include communication connections such as sessions, connections, paths, or links. In the fifth embodiment, a case in which a session SS is used as a unit for managing communication will be described. In the fifth embodiment, message data MD transmitted and received in the same session SS is processed together (e.g., encrypted, erased, decrypted). The session SS is realized using, for example, a secure sockets layer (SSL).

In the fifth embodiment, application software 11 of the first information processing device 2 operates as one of the message exchanges, and application software 32 of the second information processing device 3 operates as the other message exchange. The application software 11 and 32 may be the same software.

First, encryption processing performed by the first information processing device 2 is described.

In the fifth embodiment, by executing the application software 11, a processor 8 functions as a user authentication unit 14, a session processing unit 76, a message exchange unit 77, a data acquisition unit 15, an encryption unit 16, and a data processing unit 18.

When the application software 11 is started by the processor 8 under the control of an OS 10 (S1101), the user authentication unit 14 determines whether or not the first user U1 of the first information processing device 2 is permitted to use the application software 11 (S1102). In the case where the authentication fails, the processing ends.

In a case where it is determined that the first user U1 is permitted to use the application software 11, the session processing unit 76 receives a session start instruction from the first user U1 via an operation reception device 4 (S1103).

The first user U1 who has input the session start instruction may be described as an owner or a setter.

In the case where the session start instruction is received, the session processing unit 76 transmits a participation request 80 with respect the session SS to the second information processing device 3 of the second user U2 who is a message exchange partner via the communication device 6 (S1104).

The session processing unit 76 determines whether or not a participation consent notification 81 has been received as a response to the participation request 80 from the second information processing device 3 via the communication device 6 (S1105). In the case where the session processing unit 76 receives a notification that the participation is not consented to (a participation non-consent notification), the processing ends.

In the case where the participation consent notification 81 is received, the session processing unit 76 cooperates with a session processing unit 78 of the second information processing device 3, and starts the session SS between the first information processing device 2 and the second information processing device 3 (S1106).

The message exchange unit 77 executes exchange of at least one message data MD between the first information processing device 2 and the second information processing device 3 (S1107).

In the case where an instruction to end the message exchange is received from the first user U1 via the operation reception device 4, the message exchange unit 77 transmits a message exchange end notification 82 to the second information processing device 3 via the communication device 6, and ends the message exchange. Alternatively, in the case where the message exchange end notification 82 is received from the second information processing device 3 via the communication unit 6, the message exchange unit 77 ends the message exchange (S1108).

The data acquisition unit 15 acquires (e.g., generates) original data 9 including an original data body 9*d* including the message data MD transmitted and received between the first information processing device 2 and the second information processing device 3 using the session SS and metadata 9*m*, and causes it to be stored in a confidential area 7*s* of a storage device 7 (S1109).

The encryption unit 16 encrypts the original data body 9*d* of the original data 9 stored in the confidential area 7*s* of the storage device 7 using an encryption key 12, generates first encrypted data 21, and causes the first encrypted data 21 to be stored in the confidential area 7*s* (S1110).

The encryption unit 16 causes a screen prompting the first user U1 to designate a transmission destination of the first encrypted data 21 stored in the confidential area 7*s* to be displayed on a display unit 5. The encryption unit 16 receives the designation of the transmission destination from the first user U1 via the operation reception device 4 (S1111).

The encryption unit 16 transmits the first encrypted data 21 stored in the confidential area 7*s* to the second information processing device 3, which is the designated transmission destination, via the communication device 6 (S1112).

The data processing unit 18 deletes at least one message data MD stored in the storage device 7 and transmitted and received between the first information processing device 2 and the second information processing device 3 using the session SS, the original data 9 stored in the confidential area 7*s*, and the first encrypted data 21 stored in the storage device 7 (S1113).

The data processing unit 18 receives second encrypted data 22 from the second information processing device 3 via the communication unit 6, and causes the encrypted data 22 to be stored in the storage device 7 (S1114).

When the second encrypted data 22 is received, the session processing unit 76 ends the session SS between the first information processing device 2 and the second information processing device 3 (S1115).

Next, the encryption processing executed by the second information processing device 3 is described.

In the fifth embodiment, by executing the application software 32, a processor 30 functions as a user authentication unit 34, the session processing unit 78, a message exchange unit 79, an encryption unit 36, and a data processing unit 38.

When an OS 31 executed by the processor 30 receives the participation request 80 from the first information processing device 2 via a communication device 28, the processor 30 starts the application software 32 under the control of the OS 31 (S1116).

When the application software 32 is started by the processor 30, the user authentication unit 34 determines whether or not a second user U2 of the second information processing device 3 is permitted to use the application software 32 (S1117). In the case where the authentication fails, the processing ends.

The user authentication unit 34 causes a display unit 27 to display a screen prompting the second user U2 to designate whether or not the second user U2 will participate in the message exchange based on the participation request 80. The user authentication unit 34 receives consent to participate in the message exchange using the session from the second user U2 via the operation reception device 4 (S1118).

The second user U2 who has input the participation consent may be described as a participant.

When the user authentication unit 34 receives the participation consent from the second user U2 via an operation reception device 26, the participation consent notification 81 is transmitted to the first information processing device 2 via the communication device 28 (S1119). Note that, in a case where the participation consent is not received, the user authentication unit 34 transmits a notification indicating that participation is not consented to the first information processing device 2 via the communication device 28, and ends the processing.

The session processing unit 78 cooperates with the session processing unit 76 of the first information processing device 2 and starts the session SS between the first information processing device 2 and the second information processing device 3 (S1120).

The message exchange unit 79 executes exchange of at least one message MD between the first information processing device 2 and the second information processing device 3 (S1121).

In the case where an instruction to end the message exchange is received from the second user U2 via the operation reception device 26, the message exchange unit 79 transmits the message exchange end notification 82 to the first information processing device 2 via the communication device 28 and ends the message exchange. Alternatively, in the case where the message exchange end notification 82 is received from the first information processing device 2 via the communication device 28, the message exchange unit 79 ends the message exchange (S1122).

When the first encrypted data 21 is received from the first information processing device 2 via the communication device 28, the encryption unit 36 causes the first encrypted data 21 to be stored in a confidential area 29*s* of a storage device 29 (S1123).

The encryption unit 36 generates second encrypted data 22 based on the first encrypted data 21 and an encryption key 23, and causes the second encrypted data 22 to be stored in the storage device 29 (S1124).

The encryption unit 36 transmits the second encrypted data 22 stored in the storage device 29 to the first information processing device 2 via the communication device 28 (S1125).

The data processing unit 38 deletes at least one message data MD transmitted and received between the first information processing device 2 and the second information processing device 3 using the session SS. Furthermore, after the second encrypted data 22 is generated, the data processing unit 38 deletes the first encrypted data 21 stored in the confidential area 7*s* (S1126).

After transmitting the second encrypted data 22, the session processing unit 78 ends the session SS between the first information processing device 2 and the second information processing device 3 (S1127).

In the fifth embodiment described above, the message data MD exchanged between the first information processing device 2 and the second information processing device 3 is double-encrypted, and the double-encrypted message data MD is stored in both the first information processing device 2 and the second information processing device 3.

This double-encrypted message data MD cannot be decrypted unless the first user U1 and the second user both consent to the decryption.

Therefore, the confidentiality of the message data MD can be ensured and loss of the data can be prevented, thus ensuring data security.

In the fifth embodiment, the message data MD associated with the session SS is double encrypted and deleted.

After the message data MD is deleted, the message data MD cannot be decrypted and viewed unless the first user U1 and the second user U2 both consent to the decryption. Thus, the security of data can be ensured.

In the fifth embodiment, the original data 9 is generated based on the message data MD, and the first encrypted data 21 is generated based on the original data 9. However, for example, the first encrypted data 21 may be generated without the original data being generated based on the message data MD.

In the fifth embodiment, the case of a single participant is described as an example. However, the number of participants may be multiple. In the case where there are multiple participants, the first information processing device 2 transmits the participation request 80 to the information processing devices of the multiple participants, and starts the session SS between the multiple information processing devices. The first information processing device 2 and the information processing devices of the multiple participants transmit and receive the message data MD using the session SS. The first information processing device 2 and the multiple information processing devices may perform encryption and storage of data a plurality of times. In this case, the encrypted data is decrypted, for example, when the owner and the multiple participants consent to the decryption.

In the fifth embodiment, in the case where there are multiple participants, the owner may select (nominate) a specific participant from among the multiple participants to cooperate in encryption and decryption. Alternatively, the owner and the multiple participants may consult and select a specific participant to cooperate in the encryption and the decryption. The information processing device of the selected specific participant operates as the second information processing device 3. The first information processing device 2 of the owner may obtain decrypted data 25 in the case where the specific participant consents to the decryption.

In the fifth embodiment, the information processing system 1 may execute the encryption processing of the message data MD at regular intervals. In this case, after receiving a session start instruction from the first user U1, the first information processing device 2 notifies the second information processing device 3 that the session SS will be started, and executes a time management sub-process for encrypting data, storing the encrypted data, and deleting the data at regular intervals.

The application software 11 and 32 repeats encryption of data, storage of encrypted data, and deletion of data each time a certain amount of time elapses.

When the message exchange is ended, the first information processing device 2 and the second information processing device 3 exit the loop of the time management sub-process, complete the remaining tasks, and end the session SS.

In the fifth embodiment, in the case of executing the decryption processing of the second encrypted data 22, a session SS may be started between the first information processing device 2 and the second information processing device 3. In this case, the first information processing device 2 and the second information processing device 3 may use the session SS to transmit and receive the decryption request 58, the notification 59, the identification information 60 of the second encrypted data 22, and the first encrypted data 21.

For example, suppose the information processing device of the owner and the information processing device of a specific participant selected from among multiple participants decrypt the second encrypted data 22 and generate the decrypted data 25. In this case, during the decryption processing, a session SS may be started between the information processing device of the owner and the information processing devices of the multiple participants, and, during a period in which this session SS is maintained (a period until the session ends), the information processing devices of the multiple participants may acquire the decrypted data 25 from the information processing device of the owner and display it by the display device. This allows the owner and the plurality of participants to view the decrypted data 25 for the period during which the session SS is maintained.

In the fifth embodiment, the communication between the first information processing device 2 and the second information processing device 3 may be executed directly, over a network, or via one or more servers.

Sixth Embodiment

In a sixth embodiment, a first information processing device 2 and a second information processing device 3 share and edit data (e.g., files) of the first information processing device 2, the first information processing device 2 and the second information processing device 3 execute a two-step encryption with respect to this shared data, and the first information processing device 2 and the second information processing device 3 store the two-step encrypted data.

Figure 12:
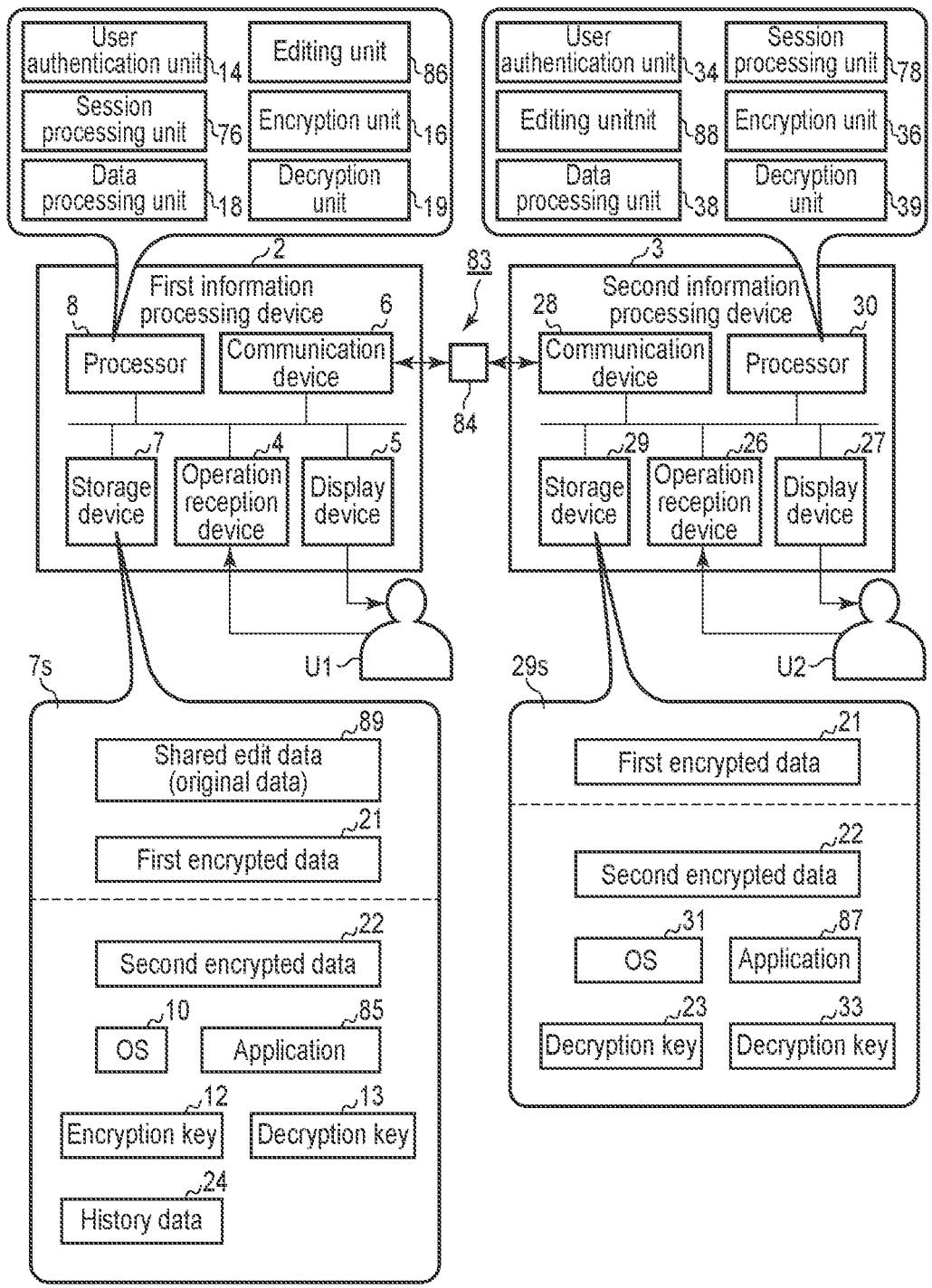
FIG. 12 is a block diagram showing an example of a configuration of an information processing system according to a sixth embodiment.

FIG. 12 is a block diagram showing an example of a configuration of an information processing system 83 according to the sixth embodiment.

The information processing system 83 includes the first information processing device 2, the second information processing device 3, and a server 84.

The first information processing device 2 and the second information processing device 3 can communicate with each other via the server 84. The server 84, for example, relays communications between the first information processing device 2 and the second information processing device 3. The functions of the server 84 need not be realized by an independent device. For example, the functions of the server 84 may be realized by the first information processing device 2 or the second information processing device 3.

By executing application software 85, a processor 8 of the first information processing device 2 functions as a user authentication unit 14, an editing unit 86, a session processing unit 76, an encryption unit 16, a data processing unit 18, and a decryption unit 19.

By executing application software 87, a processor 30 of the second information processing device 3 functions as a user authentication unit 34, a session processing unit 78, an editing unit 88, an encryption unit 36, a data processing unit 38, and a decryption unit 39.

Shared edit data 89 is stored in a confidential area 7s of a storage device 7 of the first information processing device 2. In the sixth embodiment, in order to make the shared edit data 89 editable and viewable not only by the first information processing device 2 but also by the second information processing device 3, at least a part of the confidential area 7s (an area in which the shared edit data 89 is stored) may be a shared storage area shared by the first information processing device 2 and the second information processing device 3 for which participation is consented. As described above, in the sixth embodiment, the confidential area 7s of the first information processing device 2 of a first user U1 is controlled to be shareable with users the first user U1 has consented to.

The shared edit data 89 is, for example, multimedia data shared between the first information processing device 2 and the second information processing device 3. The shared edit data 89 can be edited by the first information processing device 2 and also by the second information processing device 3. The shared edit data 89 may be, for example, a combination of still image data, moving image data, text data, document data, message data, and sound data. The shared edit data 89 according to the sixth embodiment corresponds to, for example, the original data 9 according to the first embodiment.

The application software 85 executed on the first information processing device 2 and the application software 87 executed on the second information processing device 3 can be used as an editor for the shared edit data 89.

In the sixth embodiment, the application software 85 realizes a multimedia board that is an environment in which multimedia data can be edited from either the first information processing device 2 or the second information processing device 3. The editing status of the shared edit data 89 on the multimedia board can be displayed on a display device 5 and a display device 27 in substantially real time. The shared edit data 89 is stored, for example, in the confidential area 7s of the storage device 7. The multimedia board may be a file that can be shared by multiple users.

Figure 13:
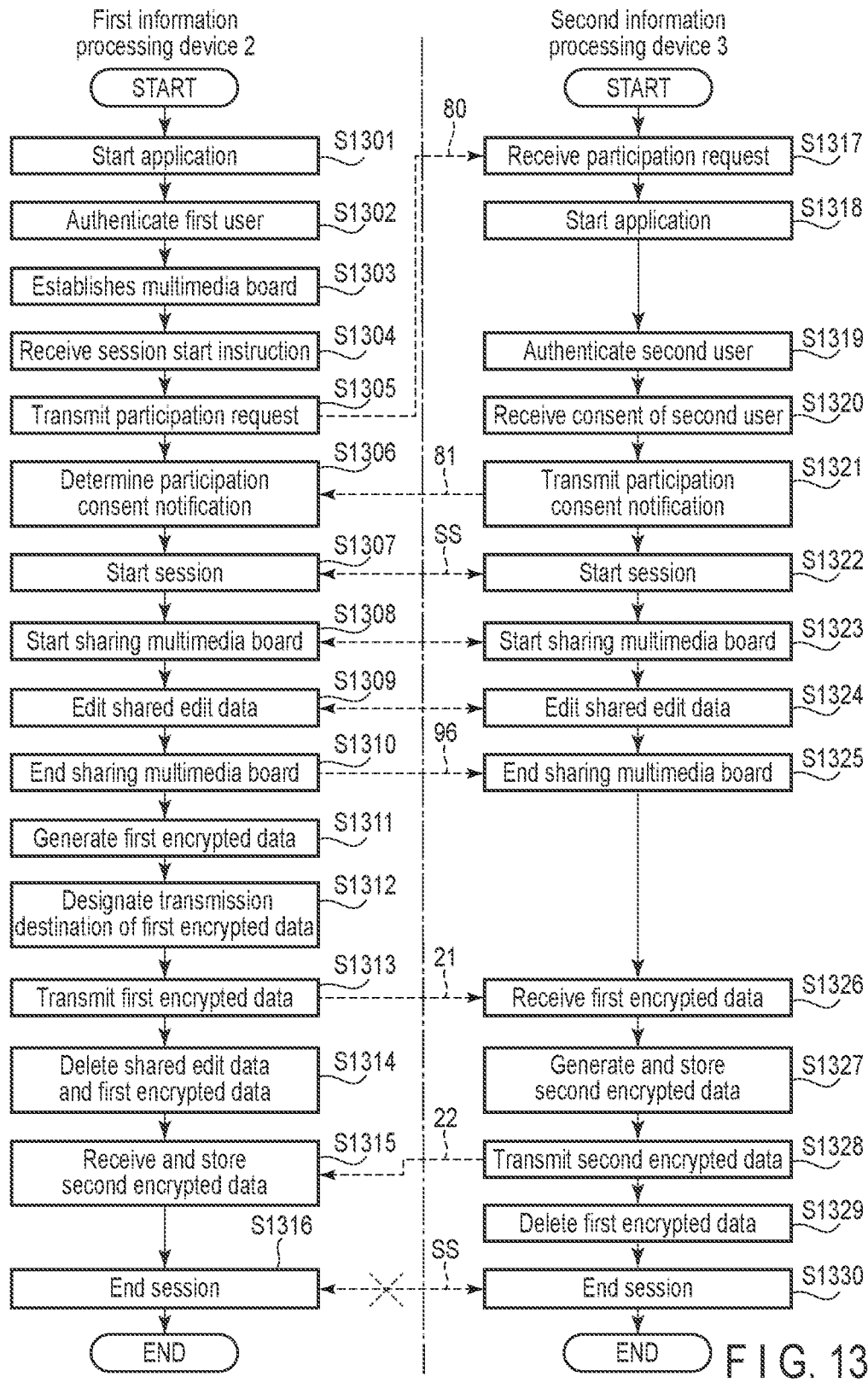
FIG. 13 is a flowchart illustrating an example of encryption processing executed by the information processing device according to the sixth embodiment.

FIG. 13 is a flowchart showing an example of encryption processing executed by the information processing system 83 according to the sixth embodiment.

First, the encryption processing executed by the first information processing device 2 is described.

When the application software 85 is started by the processor 8 under the control of an OS 10 (S1301), the user authentication unit 14 determines whether or not the first user U1 of the first information processing device 2 is permitted to use the application software 85 (S1302). In the case where the authentication fails, the processing is ended.

In the case where it is determined that the first user U1 is permitted to use the application software 85, the editing unit 86 establishes the multimedia board to be shared between the first information processing device 2 and the second information processing device 3 (S1303).

The session processing unit 76 receives a session start instruction from first user U1 via an operation reception device 4 (S1304).

In the case where the session processing unit 76 receives the session start instruction, it transmits a participation request 80 with respect to a session SS to the second information processing device 3 of a second user U2 via a communication device 6 (S1305).

The session processing unit 76 determines whether or not a participation consent notification 81 is received from the second information processing device 3 via the communication device 6 as a response to the participation request 80 (S1306). In the case where the session processing unit 76 receives a participation non-consent notification, the processing is ended.

In the case where the participation consent notification 81 is received, the session processing unit 76 cooperates with the session processing unit 78 of the second information processing device 3, and starts the session SS between the first information processing device 2 and the second information processing device 3 (S1307).

The editing unit 86 starts sharing the multimedia board between the first information processing device 2 and the second information processing device 3 (S1308).

The editing unit 86 edits the shared edit data 89 on the multimedia board (S1309).

When the editing unit 86 receives the end of sharing the multimedia board from the first user U1 via the operation reception device 4, the sharing of the multimedia board is ended (S1310), and an ending multimedia board sharing notice 96 is transmitted to the second information processing device 3 via the communication device 6.

The encryption unit 16 encrypts the shared edit data 89 stored in the confidential area 7s of the storage device 7 using an encryption key 12, generates first encrypted data 21, and causes the first encrypted data 21 to be stored in the confidential area 7s (S1311).

The encryption unit 16 causes the display unit 5 to display a screen prompting the first user U1 to designate a transmission destination of the first encrypted data 21 stored in the confidential area 7s. The encryption unit 16 receives the designation of the transmission destination from the first user U1 via the operation reception device 4 (S1312).

The encryption unit 16 transmits the first encrypted data 21 stored in the confidential area 7s to the second information processing device 3, which is the designated transmission destination, via the communication device 6 (S1313).

The data processing unit 18 deletes the shared edit data 89 stored in the storage device 7 and the first encrypted data 21 stored in the storage device 7 (S1314).

The data processing unit 18 receives second encrypted data 22 from the second information processing device 3 via communication device 6, and stores the second encrypted data 22 in the storage device 7 (S1315).

When the second encrypted data 22 is received, the session processing unit 76 ends the session SS between the first information processing device 2 and the second information processing device 3 (S1316).

Next, the encryption processing executed by the second information processing device 3 is described.

When the participation request 80 is received by an OS 31 executed by the processor 30 from the first information processing device 2 via a communication device 28 (S1317), the processor 30 starts the application software 87 under the control of the OS 31 (S1318).

When the application software 87 is started by the processor 30, the user authentication unit 34 determines whether or not the second user U2 of the information processing device 3 is permitted to use the application software 87 (S1319). In the case where the authentication fails, the processing is ended.

The user authentication unit 34 causes the display device 27 to display a screen prompting the second user U2 to designate whether or not the second user U2 will participate in the session SS based on the participation request 80. The user authentication unit 34 receives consent to participate in the session SS from the second user U2 via the operation reception device 4 (S1320).

When the user authentication unit 34 receives the participation consent from the second user U2 via the operation reception device 26, the participation consent notification 81 is transmitted to the first information processing device 2 via the communication device 28 (S1321). Note that, in a case where the participation consent is not received, the user authentication unit 34 transmits a notification indicating that the participation is not consented to the first information processing device 2 via the communication device 28, and ends the processing.

The session processing unit 78 cooperates with the session processing unit 76 of the first information processing device 2 and starts the session SS between the first information processing device 2 and the second information processing device 3 (S1322).

The editing unit 88 starts sharing the multimedia board between the first information processing device 2 and the second information processing device 3 (S1323).

The editing unit 88 edits the shared edit data 89 on the multimedia board (S1324).

When the editing unit 88 receives the ending multimedia board sharing notice 96 from the first information processing device 2 via the communication device 28, the sharing of the multimedia board is ended (S1325).

When the first encrypted data 21 is received from the first information processing device 2 via the communication device 28, the encryption unit 36 causes the first encrypted data 21 to be stored in a confidential area 29 of a storage device 29 (S1326).

The encryption unit 36 generates the second encrypted data 22 based on the first encrypted data 21 and an encryption key 23, and causes the second encrypted data 22 to be stored in the storage device 29 (S1327).

The encryption unit 36 transmits the second encrypted data 22 stored in the storage device 29 to the first information processing device 2 via the communication device 28 (S1328).

The data processing unit 38 deletes the first encrypted data 21 stored in the confidential area 7s (S1329).

After the second encrypted data 22 is transmitted, the session processing unit 78 ends the session SS between the first information processing device 2 and the second information processing device 3 (S1330).

In the above encryption processing, the order of the processing can be changed as needed. For example, S1303 can be executed at any timing between S1302 and S1308. For example, S1329 can be executed at any timing after S1327.

Figure 14:
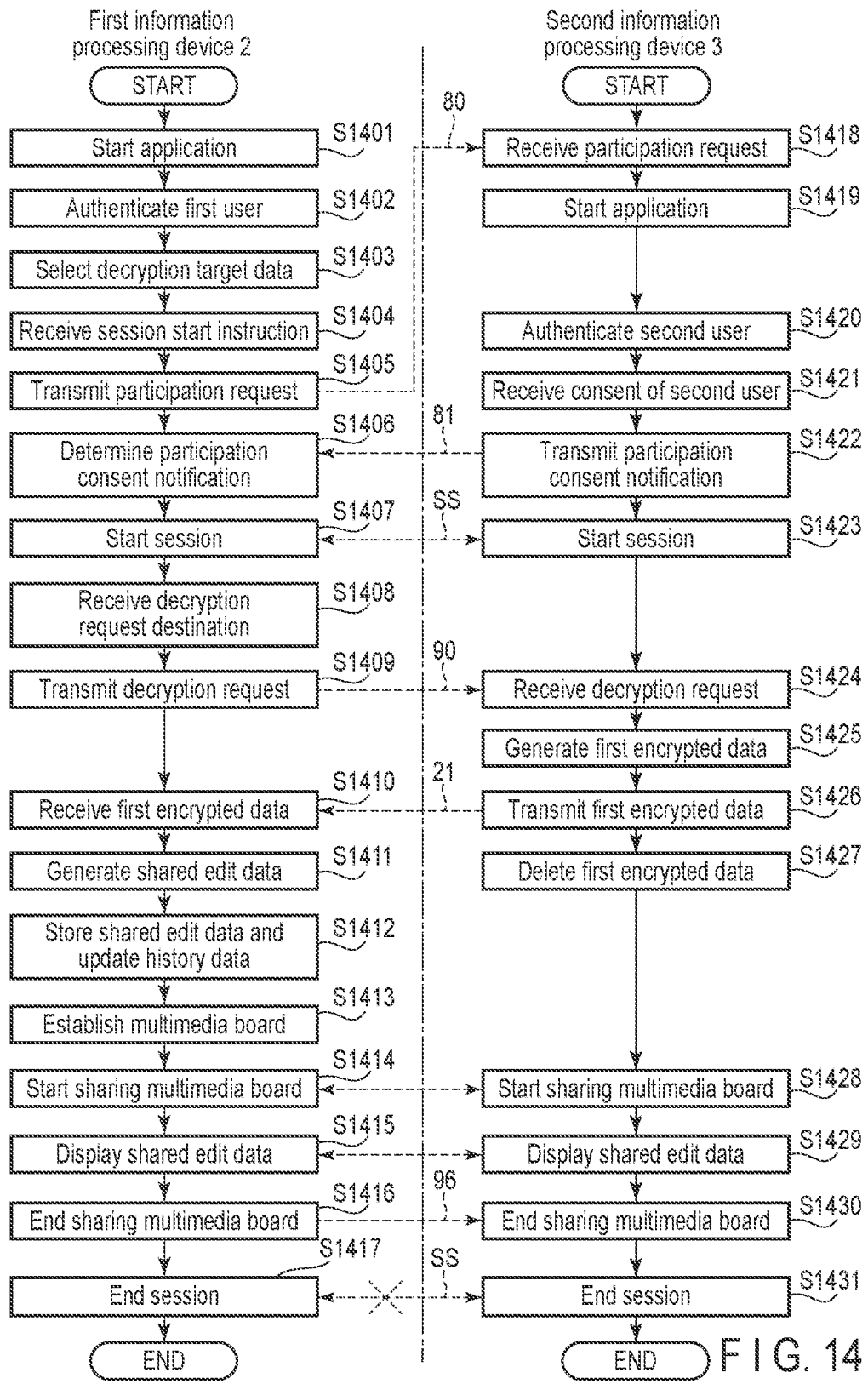
FIG. 14 is a flowchart illustrating an example of decryption processing executed by the information processing device according to the sixth embodiment.

FIG. 14 is a flowchart showing an example of decryption processing executed by the information processing system 83 according to the sixth embodiment.

First, the decryption processing executed by the first information processing device 2 is described.

When the application software 85 is started by the processor 8 under the control of the OS 10 (S1401), the user authentication unit 14 determines whether or not the first user U1 of the first information processing device 2 is permitted to use the application software 85 (S1402). In the case where the authentication fails, the processing is ended.

In the case where it is determined that the first user U1 is permitted to use the application software 85, the decryption unit 19 receives a selection of the second encrypted data 22 to be decrypted from the first user U1 via the operation reception device 4 (S1403).

The session processing unit 76 receives a session start instruction from first user U1 via the operation reception device 4 (S1404).

In the case where the session start instruction is received, the session processing unit 76 transmits the participation request 80 with respect to the session SS to the second information processing device 3 of the second user U2 via the communication device 6 (S1405).

The session processing unit 76 determines whether or not the participation consent notification 81 has been received as a response to the participation request 80 from the second information processing device 3 via the communication device 6 (S1406). In a case where the session processing unit 76 receives a participation non-consent notification, the processing is ended.

In the case where the participation consent notification 81 is received, the session processing unit 76 cooperates with the session processing unit 78 of the second information processing device 3, and starts the session SS between the first information processing device 2 and the second information processing device 3 (S1407).

The decryption unit 19 receives a decryption request destination from the first user U1 via the operation reception device 4 (S1408).

In the case where the decryption request destination is received, the decryption unit 19 transmits a decryption request 90 to the second information processing device 3, which is the decryption request destination, via the communication device 6 (S1409).

The decryption unit 19 receives, as a response to the decryption request 90, the first encrypted data 21 corresponding to the decryption request 90 from the second information processing device 3 via the communication device 6, and causes the first encrypted data 21 to be stored in the confidential area 7s of the storage device 7 (S1410).

The decryption unit 19 decrypts the first encrypted data 21 stored in the storage device 7, and generates the shared edit data 89 (S1411). The shared edit data 89 obtained by the decryption corresponds to the decrypted data 25 according to the first embodiment.

The decryption unit 19 causes the shared edit data 89 to be stored in the confidential area 7s of the storage device 7, and the data processing unit 18 updates historical data 24 in the storage device 7 (S1412).

The editing unit 86 establishes the multimedia board to be shared between the first information processing device 2 and the second information processing device 3 (S1413).

The editing unit 86 starts sharing the multimedia board between the first information processing device 2 and the second information processing device 3 (S1414).

The editing unit 86 causes the display device 5 to display the shared edit data 89 stored in the confidential area 7s of the storage device 7s on the multimedia board (S1415). This allows the first user U1 to view the contents of the shared edit data 89.

When the editing unit 86 receives the end of sharing the multimedia board from the first user U1 via the operation reception device 4, the sharing of the multimedia board is ended (S1416), and the ending multimedia board sharing notice 96 is transmitted to the second information processing device 3 via the communication device 6.

The session processing unit 76 ends the session SS between the first information processing device 2 and the second information processing device 3 (S1417).

Next, the decryption processing executed by the second information processing device 3 is described.

When the OS 31 executed by the processor 30 receives the participation request 80 from the first information processing device 2 via the communication device 28 (S1418), the processor 30 starts the application software 87 under the control of the OS 31 (S1419).

When the application software 87 is started by the processor 30, the user authentication unit 34 determines whether or not the second user U2 of the second information processing device 3 is permitted to use the application software 87 (S1420). In the case where the authentication fails, the processing is ended.

The user authentication unit 34 causes the display device 27 to display a screen prompting the second user U2 to designate whether or not the second user U2 will participate in the session SS based on the participation request 80. The user authentication unit 34 receives consent to participate in the session SS from the second user U2 via the operation reception device 4 (S1421).

When the participation consent is received from the second user U2 via the operation reception device 26, the user authentication unit 34 transmits the participation consent notification 81 to the first information processing device 2 via the communication device 28 (S1422). In a case where the participation consent is not received, the user authentication unit 34 transmits a notification indicating that the participation is not consented to the first information processing device 2 via the communication device 28, and the processing is ended.

The session processing unit 78 cooperates with session processing unit 76 of the first information processing device 2, and starts the session SS between the first information processing device 2 and the second information processing device 3 (S1423).

The decryption unit 39 receives the decryption request 90 from the first information processing device 2 via the communication device 28 (S1424).

The decryption unit 39 generates the first encrypted data 21 by decrypting the second encrypted data 22 stored in the storage device 29 and corresponding to the decryption request 90, and causes the first encrypted data to be stored in the confidential area 29s of the storage device 29 (S1425).

The decryption unit 39 transmits the first encrypted data 21 stored in the confidential area 29s to the first information processing device 2 via the communication device 28 (S1426).

The data processing unit 38 deletes the first encrypted data 21 from the confidential area 29s (S1427).

The editing unit 88 starts sharing the multimedia board between the first information processing device 2 and the second information processing device 3 (S1428).

The editing unit 88 causes the display device 27 to display the shared edit data 89 on the multimedia board (S1429). This allows the second user U2 to view the contents of the shared edit data 89.

When the editing unit 88 receives the ending multimedia board sharing notification 96 from the first information processing device 2 via the communication device 28, the sharing of the multimedia board is ended (S1430).

The session processing unit 78 ends the session SS between the first information processing device 2 and the second information processing device 3 (S1431).

In the decryption processing described above, the order of the processing can be changed as needed. For example, S1403 can be executed at any timing between S1402 and S1409.

In the sixth embodiment described above, the first user U1 starts the application software 85, selects the data to be encrypted, performs the first encryption, and searches for the second user U2 to request the second encryption. In the sixth embodiment, the first user U1 and the second user U2 can jointly edit multimedia data, including still image data, moving image data, text data, document data, message data, sound data, etc., can execute two-step encryption in a jointly manner, perform storage in a jointly manner, execute two-step decryption in a jointly manner, and view the data.

In the sixth embodiment, a secure session SS and a secure editing environment are realized between the first information processing device 2 and the second information processing device 3.

This allows the first user U1 and the second user U2 to jointly manage the second encrypted data 22, and view or edit the original shared edit data 89 in the case where both parties consent thereto. In the sixth embodiment, the privacy of the first user U1 and the second user U2 can be protected.

In the following, specific examples of the effects obtained by the information processing system 83 according to the sixth embodiment are described.

In the sixth embodiment, the second information processing device 3 accesses the file (shared edit data 89) of the first information processing device 2. Therefore, by ensuring the security of communication, secure data management can be performed.

In the sixth embodiment, even in a case where the communication between the first information processing device 2 and the second information processing device 3 is disconnected in the middle, only the data being viewed is temporarily present in the second information processing device 3, and when the application software 87 is ended, the data related to the shared edit data 89 would not remain in the second information processing device 3. Even at the time of decryption, the second information processing device 3 does not have the finally decrypted shared edit data 89, and only accesses the shared edit data 89 finally decrypted at the first information processing device 2. Therefore, it is possible to prevent the shared edit data 89 from remaining in the second information processing device 3, and the shared edit data 89 can be safely managed at the first information processing device 2.

Seventh Embodiment

In a seventh embodiment, a modified example of the sixth embodiment described above is described. In the sixth embodiment described above, the multimedia board is realized by the first information processing device 2. In contrast, in the seventh embodiment, a multimedia board is realized by a cloud environment provided by a server 84.

FIG. 15 is a block diagram showing an example of a configuration of an information processing system 91 according to the seventh embodiment.

The information processing system 91 includes a first information processing device 2, a second information processing device 3, and the server 84.

The first information processing device 2, the second information processing device 3, and the server 84 can communicate with each other via a network 45.

The server 84 includes a communication device 46, a storage device 47, and a processor 48. The storage device 47 stores an OS 49 and a server software 92.

The server software 92, when executed by the processor 48, provides a cloud environment for the first information processing device 2 and the second information processing device 3.

Specifically, the server 84 allocates cloud storage areas CA1 and CA2 to a first user U1 (or the first information processing device 2) and a second user U2 (or the second information processing device 3), respectively.

The cloud storage area CA1 includes a shared area SA1 and a private area PA1. The shared area SA1 can be accessed by the first user U1 and other users. The private area PA1 can be accessed by the first user U1, but is prohibited to be accessed by other users who are not the first user U1.

The cloud storage area CA2 includes a shared area SA2 and a private area PA2. The shared area SA2 can be accessed by the second user U2 and other users. The private area SA2 can be accessed by the second user U2, but is prohibited to be accessed by other users who are not the second U2.

In the seventh embodiment, a processor 8 of the first information processing device 2 and a processor 30 of the second information processing device 3 execute processing for editing and viewing shared edit data 89 in the shared area SA1.

For example, in a case where a session SS between the first information processing device 2 and the second information processing device 3 is ended, encryption processing is executed.

In this encryption processing, the processor 8 of the first information processing device 2 executes a first encryption with respect to the shared edit data 89, generates first encrypted data 21, and causes the first encrypted data 21 to be temporarily stored in the shared area SA1.

The processor 30 of the second information processing device 3 executes a second encryption with respect to the first encrypted data 21 of the shared area SA1, and causes second encrypted data 22 to be temporarily stored in the shared area SA1.

The processor 8 of the first information processing device 2 causes the second encrypted data 22 of the shared area SA1 to be stored in the private area PA1, and the processor 30 of the second information processing device 3 causes the second encrypted data 22 of the shared area SA1 to be stored in the private area PA2.

Then, the shared edit data 89 of the shared area SA1, the first encrypted data 21 of the shared area SA1, and the second encrypted data 22 of the shared area SA1 are deleted by the processor 8 of the first information processing device 2, the processor 30 of the second information processing device 3, or the processor 48 of the server 84.

In decryption processing, the processor 30 of the second information processing device 3 executes a first decryption with respect to the second encrypted data 22 of the private area PA2, and causes the first decrypted data 21 to be temporarily stored in the shared area SA1.

The processor 8 of the first information processing device 2 executes a second decryption with respect to the first encrypted data 21 of the shared area SA1, and causes the shared edit data 89 to be temporarily stored in the shared area SA1.

After the second decryption, the first encrypted data 21 of the shared area SA1 is deleted by the first processor 8 of the first information processing device 2, the processor 30 of the second information processing device 3, or the processor 48 of the server 84.

After the decryption processing, the processor 8 of the first information processing device 2 and the processor 30 of the second information processing device 3 execute processing for editing and viewing with respect to the shared edit data 89 of the shared area SA1.

FIG. 16 shows an example of a multimedia board 93 realized by the information processing system 91 according to the seventh embodiment.

The server 84 provides the multimedia board 93 with respect to the first information processing device 2 and the second information processing device 3.

The first user U1 operating the first information processing device 2 and the second user U2 operating the second information processing device 3 are able to view and edit the shared edit data 89 on the multimedia board 93. The first user U1 and the second user U2 can create the shared edit data 89 by combining various types of data such as text data 89A, image data 89B, and message data 89C.

The text data 89A, the image data 89B, and the message data 89C include metadata 94a to 94c and data bodies 95a to 95c, respectively. The first information processing device 2 and the second information processing device 3 cause the data bodies 95a to 95c to be displayed on display devices 5 and 27 in an easy-to-understand manner according to data attributes included in the metadata 94c to 94c.

In the encryption processing of the seventh embodiment, when the first information processing device 2 of the first user U1 starts up application software 85, the multimedia board 93, for example, in an initial state (default) is opened.

The first information processing device 2 establishes a session SS and invites the second user U2 or a plurality of users to the multimedia board 93 (transmission of a participation request).

When the first user U1 receives a participation consent notification 81 of the second user U2 or the plurality of users, the multimedia board 93 is shared between the first user U1 and the second user U2 or the plurality of users.

The first user U1 and the second user U2 or the plurality of users edit the shared edit data 89 on the multimedia board 93. For example, the first user U1 and the second user U2 or the plurality of users can exchange messages on the multimedia board 93, and perform editing of the text data 89A, pasting of the image data 89B, pasting of the message data 89C, etc.

When the use of the multimedia board 93 is ended, the first information processing device 2 executes a first encryption with respect to the shared edit data 89 on the multimedia board 93 and generates the first encrypted data 21.

The first user U1 designates a specific user among the second user U2 or the plurality of users. The first information processing device 2 requests a second encryption to the second information processing device 3 of the second user U2 or an information processing device of a specific user.

The second information processing device 3 or the information processing device of the specific user executes the second encryption with respect to the first encrypted data 21 and generates the second encrypted data 22.

The first information processing device 2 and the second information processing device 3 or the information processing device of the specific user store the second encrypted data 22.

Note that the first information processing device 2 and information processing devices of a plurality of users may also store the second encrypted data 22.

In the decryption processing of the seventh embodiment, when the first information processing device 2 of the first user U1 starts up the application software 85, the first information processing device 2 invites the second user U2 or at least a specific user among the plurality of users and establishes the session SS.

The second information processing device 3 or the information processing device of the specific user executes the decryption processing with respect to the second encrypted data 22 and generates the first encrypted data 21.

The first information processing device 2 executes the decryption processing with respect to the first encrypted data 21 and generates the shared edit data 89.

The first information processing device 2 opens the multimedia board 93 to be shared with the first user U1 and the second user U2 or at least the specific user who has consented to participate.

The first user U1 and the second user U2 or at least the specific user can edit and view the shared edit data 89 on the multimedia board 93.

FIG. 17 is a flowchart showing an example of processing executed by the information processing system 91 according to the seventh embodiment.

In the encryption processing, the first information processing device 2 executes an encryption with respect to the shared edit data 89 in the shared area SA1 shared between the first information processing device 2 and the second information processing device 3, generates the first encrypted data 21, and causes the first encrypted data 21 to be stored in the shared area SA1 (S1701).

The second information processing device 3 executes the encryption with respect to the first encrypted data 21 stored in the shared area SA1, generates the second encrypted data 22, and causes the second encrypted data 22 to be stored in the shared area SA1 (S1702).

The first information processing device 2 causes the second encrypted data 22 stored in the shared area SA1 to be stored in the private area PA1 corresponding to the first information processing device 2 (S1703a). Similarly, the second information processing device 3 causes the second encrypted data 22 to be stored in the private area PA2 corresponding to the second information processing device 3 (S1703b).

The first information processing device 2 executes deletion with respect to the shared area SA1 for the shared edit data 89, the first encrypted data 21, and the second encrypted data 22 stored in the shared area SA1 (S1704).

In the decryption processing, the second information processing device 3 executes the decryption with respect to the second encrypted data 22 stored in the private area PA2, generates the first encrypted data 21, and causes the first encrypted data 21 to be stored in the shared area SA1 (S1705).

The first information processing device 2 executes the decryption with respect to the first encrypted data 21 stored in the shared area SA1, generates the shared edit data 89, and causes the shared edit data 89 to be stored in the shared area SA1 (S1706).

The first information processing device 2 executes deletion of the first encrypted data 21 with respect to the shared area SA1 (S1707).

In the seventh embodiment described above, the cloud environment is used to realize between the first information processing device 2 and the second information processing device 3 sharing of the shared edit data 89, generation of the first encrypted data 21, and generation of the second encrypted data 22.

Therefore, the transmission and reception of data between the first information processing device 2 and the second information processing device 3 can be simplified.

In addition, in the seventh embodiment, the shared edit data 89 can be edited safely, and the second encrypted data 22 can be stored safely.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing system comprising:
a first device operated by a first user who designates data to be an encryption target and, subsequently, designates data to be a decryption target;
a second device operated by a second user selected by the first user; and
a server capable of communicating with the first device and the second device and comprising a storage area, wherein
the first device and the second device are provided with:
a function of forming a session between the first device and the second device; and
a function of causing an original data body to be stored in the storage area, the original data body being communication data shared by the first user and the second user through communication between the first device and the second device using the session, wherein
the first device is provided with:
in encryption processing, a function of causing original data including the original data body designated by the first user as the encryption target and original metadata corresponding to the original data body to be stored in the storage area;
in the encryption processing, a function of generating a first encrypted data body obtained by applying a first encryption with respect to the original data body using a first encryption key, generating first encrypted data including the first encrypted data body and first metadata corresponding to the first encrypted data body and associated with the original metadata, and causing the first encrypted data to be stored in a shared storage area of the storage area;
in the encryption processing, a function of causing second encrypted data that includes a second encrypted data body and second metadata to be stored in a first storage area corresponding to the first device of the storage area, the second encrypted data body generated by the second device applying a second encryption with respect to the first encrypted data body included in the first encrypted data using a second encryption key, the second metadata corresponding to the second encrypted data body and associated with the first metadata;
in the encryption processing, a function of recognizing, based on the second metadata included in the second encrypted data, the original data including the original metadata associated with the second metadata and the first encrypted data including the first metadata associated with the second metadata, deleting the original data from the storage area, and deleting the first encrypted data and the second encrypted data from the shared storage area;
in decryption processing, a function of transmitting identification information of the second encrypted data designated by the first user as the decryption target to the second device;
in the decryption processing, a function of generating the original data that includes the original data body and the original metadata, and causing the original data to be stored in the storage area, the original data body obtained by the second device applying release of the first encryption with respect to the first encrypted data body included in the first encrypted data stored in the shared storage area using a first decryption key, the original metadata corresponding to the original data body and associated with the first metadata; and
in the decryption processing, a function of deleting from the shared storage area the first encrypted data including the first metadata associated with the original metadata included in the original data,
the second device is provided with:

in the encryption processing, a function of generating the second encrypted data body by applying the second encryption with respect to the first encrypted data body included in the first encrypted data stored in the shared storage area using the second encryption key, generating the second encrypted data including the second encrypted data body and the second metadata corresponding to the second encrypted data body and associated with the first metadata, and causing the second encrypted data to be stored in the shared storage area;

in the encryption processing, a function of causing the second encrypted data stored in the shared storage area to be stored in a second storage area corresponding to the second device of the storage area; and in the decryption processing, a function of receiving the identification information from the first device, generating the first encrypted data body by applying release of the second encryption using a second decryption key with respect to the second encrypted data body included in the second encrypted data stored in the second storage area and corresponding to the identification information, generating the first encrypted data including the first encrypted data body and the first metadata corresponding to the first encrypted data body and associated with the second metadata, and causing the first encrypted data to be stored in the shared storage area, each of the original metadata, the first metadata, and the second metadata includes original data identification information, first user identification information indicating the first user, second user identification information indicating the second user, an expiration date, and a data type of the original data body, the first device, in a case where the expiration date of the second metadata included in the second encrypted data stored in the first storage area has elapsed, is further provided with a function of deleting the second encrypted data stored in the first storage area, and the second device, in a case where the expiration date of the second metadata included in the second encrypted data stored in the second storage area has elapsed, is further provided with a function of deleting the second encrypted data stored in the second storage area.

2. The information processing system of claim 1, wherein each of the original metadata, the first metadata, and the second metadata further includes a common identifier.

3. The information processing system of claim 1, wherein the first device is further provided with a function of transmitting a first request to the second device prior to the first encryption, the second device is further provided with a function of receiving the first request and, in a case where consent to the first request is received from the second user, transmitting a first consent notification to the first device, the first device, in a case where the first consent notification is received from the second device, is further provided with a function of starting the first encryption, the first device is further provided with a function of transmitting a second request to the second device prior to releasing the second encryption, the second device is further provided with a function of receiving the second request and, in a case where consent to the second request is received from the second user, transmitting a second consent notification to the first device, and the first device, in a case where the second consent notification is received from the second device, is further provided with a function of starting release of the second encryption.

4. The information processing system of claim 3, wherein the first device is further provided with a function of transmitting an extension request to the second device in a case where an instruction to extend the expiration date is received from the first user, and extending the expiration date of the second metadata included in the second encrypted data stored in the first storage area in a case where an extension consent notification for extending the expiration date is received from the second device, and the second device is further provided with a function of receiving the extension request from the first device and, in a case where consent to extend the expiration date is received from the second user, transmitting the extension consent notification to the first device and extending the expiration date of the second metadata included in the second encrypted data stored in the second storage area.

5. A computer-readable non-transitory storage medium storing a program that causes a computer to realize:

a function of forming a session between the computer and an external device;

a function of causing an original data body, which is communication data shared by a first user and a second user through communication between the computer and the external device using the session, to be stored in a storage area of an external server;

in encryption processing, a function of causing original data including the original data body and original metadata corresponding to the original data body to be stored in the storage area, the original data body being designated as an encryption target by the first user who designates data to be the encryption target and, subsequently, designates data to be a decryption target;

a function of generating a first encrypted data body by applying a first encryption with respect to the original data body using a first encryption key, generating first encrypted data including the first encrypted data body and first metadata corresponding to the first encrypted data body and associated with the original metadata, and causing the first encrypted data to be stored in a shared storage area of the storage area;

a function of causing second encrypted data to be stored in a first storage area corresponding to the computer of the storage area, the second encrypted data stored in the shared storage area by the external device and including a second encrypted data body and second metadata corresponding to the second encrypted data body and associated with the first metadata, the second encrypted data body generated by applying a second encryption with respect to the first encrypted data body included in the first encrypted data using a second encryption key by the external device operated by the second user who is selected by the first user;

a function of recognizing, based on the second metadata included in the second encrypted data, the original data including the original metadata associated with the second metadata and the first encrypted data including the first metadata associated with the second metadata, deleting the original data from the storage area, and deleting the first encrypted data and the second encrypted data from the shared storage area;

in decryption processing,
a function of transmitting identification information of the second encrypted data designated by the first user as the decryption target to the external device;
a function of generating the original data including the original data body and the original metadata corresponding to the original data body and associated with the first metadata, and causing the original data to be stored in the storage area, the original data body obtained by applying release of the first encryption with respect to the first encrypted data body included in the first encrypted data stored in the shared storage area using a first decryption key by the external device; and
a function of deleting the first encrypted data including the first metadata associated with the original metadata included in the original data from the shared storage area, wherein
each of the original metadata, the first metadata, and the second metadata includes original data identification information, first user identification information indicating the first user, second user identification information indicating the second user, an expiration date, and a data type of the original data body, and
in a case where the expiration date of the second metadata included in the second encrypted data stored in the first storage area has elapsed, the computer is caused to further realize a function of deleting the second encrypted data stored in the first storage area.

6. A computer-readable non-transitory storage medium storing a program that causes a computer to realize:
a function of forming a session between an external device and the computer;
a function of causing an original data body, which is communication data shared by a first user of the external device and a second user of the computer through communication between the external device and the computer using the session, to be stored in a storage area of an external server;
in encryption processing,
a function of generating a second encrypted data body by applying a second encryption with respect to a first encrypted data body included in first encrypted data stored in a shared storage area of the storage area by the external device, generating second encrypted data including the second encrypted data body and second metadata corresponding to the second encrypted data body and associated with the first metadata, and causing the second encrypted data to be stored in the shared storage area, the first encrypted data including the first encrypted data body and the first metadata corresponding to the first encrypted data body, the first encrypted data body generated by applying a first encryption with respect to the original data body by the external device operated by the first user who designates data to be an encryption target and, subsequently, designates data to be a decryption target;
a function of causing the second encryption data stored in the shared storage area to be stored in a second area corresponding to the computer of the storage area; and
in decryption processing,
a function of receiving from the external device identification information of the second encrypted data designated by the first user as the decryption target, generating the first encrypted data body by applying release of the second encryption with respect to the second encrypted data body included in the second encrypted data stored in the second storage area and corresponding to the identification information using a second decryption key, generating the first encrypted data including the first encrypted data body and the first metadata corresponding to the first encrypted data body and associated with the second metadata, and causing the first encrypted data to be stored in the shared storage area,
each of the first metadata and the second metadata includes original data identification information, first user identification information indicating the first user, second user identification information indicating the second user selected by the first user and operating the computer, an expiration date, and a data type of the original data body, and
in a case where the expiration date of the second metadata included in the second encrypted data stored in the second storage area has elapsed, the computer is caused to further realize a function of deleting the second encrypted data stored in the second storage area.

7. An information processing system comprising:
a first device operated by a first user who designates data to be an encryption target and, subsequently, designates data to be a decryption target, the first device including a first storage device; and
a second device operated by a second user selected by the first user, the second device including a second storage device and capable of communicating with the first device, wherein
the first device and the second device are provided with:
a function of forming a session between the first device and the second device; and
a function of causing an original data body to be stored in the first storage device, the original data body being communication data shared by the first user and the second user through communication between the first device and the second device using the session, wherein
the first device is provided with:
in encryption processing, a function of causing original data including the original data body designated by the first user as the encryption target and original metadata corresponding to the original data body to be stored in the first storage device;
in the encryption processing, a function of generating a first encrypted data body obtained by applying a first encryption with respect to the original data body using a first encryption key, generating first encrypted data including the first encrypted data body and first metadata corresponding to the first encrypted data body and associated with the original metadata, and causing the first encrypted data to be stored in the first storage device;
in the encryption processing, a function of transmitting the first encrypted data to the second device;
in the encryption processing, a function of receiving from the second device second encrypted data including a second encrypted data body and second metadata corresponding to the second encrypted data body and associated with the first metadata, and causing the second encrypted data to be stored in the first storage device, the second encrypted data body generated by applying a second encryption with respect to the first encrypted data body using a second encryption key;
in the encryption processing, a function of recognizing, based on the second metadata included in the second encrypted data, the original data including the original metadata associated with the second metadata and the first encrypted data including the first metadata associated with the second metadata, and deleting the original data and the first encrypted data from the first storage device;

in decryption processing, a function of transmitting identification information of the second encrypted data designated by the first user as the decryption target to the second device;

in the decryption processing, a function of receiving from the second device the first encrypted data including the first encrypted data body and the first metadata corresponding to the first encrypted data body and associated with the second metadata, and causing the first encrypted data to be stored in the first storage device, the first encrypted data body obtained by applying release of the second encryption using a second decryption key with respect to the second encrypted data body included in the second encrypted data stored in the second storage device and corresponding to the identification information;

in the decryption processing, a function of generating the original data body by applying release of the first encryption using a first decryption key with respect to the first encrypted data body included in the first encrypted data stored in the first storage device, generating the original data including the original data body and the original metadata corresponding to the original data body and associated with the first metadata, and causing the original data to be stored in the first storage device; and in the decryption processing, a function of deleting from the first storage device the first encrypted data including the first metadata associated with the original metadata included in the original data, the second device is provided with:

in the encryption processing, a function of causing the first encrypted data to be stored in the second storage device in a case where the second device receives the first encrypted data from the first device;

in the encryption processing, a function of generating the second encrypted data body by applying the second encryption using the second encryption key with respect to the first encrypted data body included in the first encrypted data, generating the second encrypted data including the second encrypted data body and the second metadata corresponding to the second encrypted data body and associated with the first metadata, and causing the second encrypted data to be stored in the second storage device;

in the encryption processing, a function of transmitting the second encrypted data to the first device;

in the encryption processing, a function of deleting the first encrypted data stored in the second storage device from the second storage device;

in the decryption processing, a function of receiving the identification information from the first device, generating the first encrypted data body by applying release of the second encryption using the second decryption key with respect to the second encrypted data body included in the second encrypted data stored in the second storage device and corresponding to the identification information, generating the first encrypted data including the first encrypted data body and the first metadata corresponding to the first encrypted data body and associated with the second metadata, and causing the first encrypted data to be stored in the second storage device;

in the decryption processing, a function of transmitting the first encrypted data to the first device; and in the decryption processing, a function of deleting from the second storage device the first encrypted data, each of the original metadata, the first metadata, and the second metadata includes original data identification information, first user identification information indicating the first user, second user identification information indicating the second user, an expiration date, and a data type of the original data body, the first device, in a case where the expiration date of the second metadata included in the second encrypted data stored in the first storage device has elapsed, is further provided with a function of deleting the second encrypted data stored in the first storage device, and the second device, in a case where the expiration date of the second metadata included in the second encrypted data stored in the second storage device has elapsed, is further provided with a function of deleting the second encrypted data stored in the second storage device.

8. The information processing system of claim 7, wherein each of the original metadata, the first metadata, and the second metadata further includes a common identifier.

9. The information processing system of claim 7, wherein the first device is further provided with a function of transmitting a first request to the second device prior to the first encryption, the second device is further provided with a function of receiving the first request and, in a case where consent to the first request is received from the second user, transmitting a first consent notification to the first device, the first device, in a case where the first consent notification is received from the second device, is further provided with a function of starting the first encryption, the first device is further provided with a function of transmitting a second request to the second device prior to releasing the second encryption, the second device is further provided with a function of receiving the second request and, in a case where consent to the second request is received from the second user, transmitting a second consent notification to the first device, and the first device, in a case where the second consent notification is received from the second device, is further provided with a function of starting release of the second encryption.

10. The information processing system of claim 9, wherein the first device is further provided with a function of transmitting an extension request to the second device in a case where an instruction to extend the expiration date is received from the first user, and extending the expiration date of the second metadata included in the second encrypted data stored in the first storage device in a case where an extension consent notification for extending the expiration date is received from the second device, and the second device is further provided with a function of receiving the extension request from the first device and, in a case where consent to extend the expiration date is received from the second user, transmitting the extension consent notification to the first device and extending the expiration date of the second metadata included in the second encrypted data stored in the second storage device.

11. The information processing system of claim 7, wherein
the first storage device comprises a first confidential area,
the second storage device comprises a second confidential area,
the first device causes the first encrypted data to be stored in the first confidential area, and
the second device causes the first encrypted data to be stored in the second confidential area.

12. A computer-readable non-transitory storage medium storing a program that causes a computer to realize:
a function of forming a session between the computer and an external device;
a function of causing an original data body to be stored in a storage device, the original data body being communication data shared by a first user and a second user through communication between the computer and the external device using the session;
in encryption processing,
a function of causing original data including the original data body and original metadata corresponding to the original data body to be stored in the storage device, the original data body designated by the first user as an encryption target, the first user designating data to be the encryption target and, subsequently, designating data to be a decryption target;
a function of generating a first encrypted data body by applying a first encryption using a first encryption key with respect to the original data body, generating first encrypted data including the first encrypted data body and first metadata corresponding to the first encrypted data body and associated with the original metadata, and causing the first encrypted data to be stored in the storage device;
a function of transmitting the first encrypted data to the external device, the external device operated by the second user selected by the first user;
a function of receiving from the external device the second encrypted data including a second encrypted data body and second metadata corresponding to the second encrypted data body and associated with the first metadata, and causing the second encrypted data to be stored in the storage device, the second encrypted data body generated by applying a second encryption using a second encryption key with respect to the first encrypted data body;
a function of recognizing, based on the second metadata included in the second encrypted data, the original data including the original metadata associated with the second metadata and the first encrypted data including the first metadata associated with the second metadata, and deleting the original data and the first encrypted data from the storage device;
in decryption processing,
a function of transmitting identification information of the second encrypted data designated by the first user as the decryption target to the external device;
a function of receiving from the external device the first encrypted data including the first encrypted data body and the first metadata corresponding to the first encrypted data body and associated with the second metadata, and causing the first encrypted data to be stored in the storage device, the first encrypted data body obtained by applying release of the second encryption using a second decryption key with respect to the second encrypted data body included in the second encrypted data corresponding to the identification information;
a function of generating the original data body by applying release of the first encryption using a first decryption key with respect to the first encrypted data body included in the first encrypted data stored in the storage device, generating the original data including the original data body and the original metadata corresponding to the original data body and associated with the first metadata, and causing the original data to be stored in the storage device; and
a function of deleting from the storage device the first encrypted data including the first metadata associated with the original metadata included in the original data,
each of the original metadata, the first metadata, and the second metadata includes original data identification information, first user identification information indicating the first user, second user identification information indicating the second user, an expiration date, and a data type of the original data body, and
in a case where the expiration date of the second metadata included in the second encrypted data stored in the storage device has elapsed, the computer is caused to further realize a function of deleting the second encrypted data stored in the storage device.

13. A computer-readable non-transitory storage medium storing a program that causes a computer to realize:
a function of forming a session between an external device and the computer;
a function of causing an original data body to be stored in the external device, the original data body being communication data shared by a first user of the external device and a second user of the computer through communication between the external device and the computer using the session;
in encryption processing,
a function of causing the first encrypted data to be stored in a storage device in a case where the computer receives from the external device the first encrypted data including a first encrypted data body and first metadata corresponding to the first encrypted data body, the external device operated by the first user designating data to be an encryption target and, subsequently, designating data to be a decryption target, the first encrypted data body obtained by applying a first encryption using a first encryption key with respect to the original data body;
a function of generating a second encrypted data body by applying a second encryption using a second encryption key with respect to the first data body included in the first encrypted data, and causing the second encrypted data to be stored in the storage device, the second encrypted data including the second encrypted data body and second metadata corresponding to the second encrypted data body and associated with the first metadata;
a function of transmitting the second encrypted data to the external device;
a function of deleting the first encrypted data stored in the storage device from the storage device;
in decryption processing,
a function of receiving identification information of the second encrypted data designated by the first user as the decryption target from the first device, generating the first encrypted data body by applying release of the second encryption using a second decryption key with respect to the second encrypted data body included in the second encrypted data stored in the storage device and corresponding to the identification information, generating the first encrypted data including the first encrypted data body and the first metadata corresponding to the first encrypted data body and associated with the second metadata, and causing the first encrypted data to be stored in the storage device;

a function of transmitting the first encrypted data to the external device; and a function of deleting from the storage device the first encrypted data, each of the first metadata and the second metadata includes original data identification information, first user identification information indicating the first user, second user identification information indicating the second user selected by the first user and operating the computer, an expiration date, and a data type of the original data body, and in a case where the expiration date of the second metadata included in the second encrypted data stored in the storage device has elapsed, the computer caused to further realize a function of deleting the second encrypted data stored in the storage device.

\* \* \* \* \*